United States Patent
Yapici et al.

(10) Patent No.: US 12,057,875 B2
(45) Date of Patent: Aug. 6, 2024

(54) ENHANCED POWER CONTROL FOR PSEUDO-NOISE CANCELLATION

(71) Applicant: QUALCOMM Incorporated, San Diego, CA (US)

(72) Inventors: Yavuz Yapici, Florham Park, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 110 days.

(21) Appl. No.: 18/061,379

(22) Filed: Dec. 2, 2022

(65) Prior Publication Data

US 2024/0187027 A1 Jun. 6, 2024

(51) Int. Cl.
 *H04B 1/10* (2006.01)
 *H04B 1/12* (2006.01)

(52) U.S. Cl.
 CPC ........... *H04B 1/1036* (2013.01); *H04B 1/109* (2013.01); *H04B 1/12* (2013.01)

(58) Field of Classification Search
 CPC ......... H04B 1/1036; H04B 1/109; H04B 1/12
 USPC ................................................. 375/260, 346
 See application file for complete search history.

(56) References Cited

U.S. PATENT DOCUMENTS

| 10,069,592 B1 | 9/2018 | Krunz et al. |
| 2015/0188662 A1 | 7/2015 | Shapira |
| 2019/0229833 A1 | 7/2019 | Ha et al. |
| 2022/0174592 A1* | 6/2022 | Zhang ............... H04W 52/0212 |
| 2024/0064050 A1* | 2/2024 | Lee ....................... H04L 5/0051 |

FOREIGN PATENT DOCUMENTS

WO WO-2022031246 A1 2/2022

OTHER PUBLICATIONS

Hamamreh J.M., et al., "Joint PHY/MAC Layer Security Design Using ARQ With MRC and Null-Space Independent PAPR-Aware Artificial Noise in SISO Systems", IEEE Transactions on Wireless Communications, vol. 17, No. 9, Sep. 1, 2018, XP055873193, US, pp. 6190-6204.
International Search Report and Written Opinion—PCT/US2023/076380—ISA/EPO—Jan. 2, 2024.

* cited by examiner

*Primary Examiner* — Emmanuel Bayard
(74) *Attorney, Agent, or Firm* — Holland & Hart LLP

(57) ABSTRACT

Methods, systems, and devices for wireless communications are described. For instance, first one or more wireless devices may receive or obtain a set of reference signals from second one or more wireless devices. The first one or more wireless devices may estimate a set of channel state information parameters, where each channel state parameter is based on a respective reference signal of the set of reference signals. The first one or more wireless devices may output or transmit a set of transmissions, where each transmission of the set of transmissions is based on a different gain parameter of the set of gain parameters, where each gain parameter of the set of gain parameters is based on a different channel state information parameter, and where each gain parameter of the set of gain parameters is less than a first threshold and greater than a second threshold.

30 Claims, 17 Drawing Sheets

ENHANCED POWER CONTROL FOR PSEUDO-NOISE CANCELLATION

FIELD OF TECHNOLOGY

The following relates to wireless communications, including enhanced power control for pseudo-noise cancellation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some examples, a UE may communicate with a network entity. For instance, the UE may communicate a message with the network entity. In some examples, the message may be successfully intercepted and decoded by another device. Techniques that lower a likelihood that the message is successfully intercepted and decoded by another device may increase a security of the message and may, accordingly, enable more secure communications between the UE and the network entity.

SUMMARY

The described techniques relate to improved methods, systems, devices, and apparatuses that support enhanced power control for pseudo-noise cancellation. For example, the described techniques provide for a greater range of characteristics of reference signals usable in determining parameters for transmitting pseudo-noise signals. For instance, a first one or more wireless devices (e.g., a user equipment (UE), a network entity, a cluster of network entities) may receive or obtain a set of reference signals from a second one or more wireless devices (e.g., a UE, a network entity, a cluster of network entities). The first one or more wireless devices may estimate a set of channel state information parameters, where each channel state parameter is based on a respective reference signal of the set of reference signals. The first one or more wireless devices may output or transmit a set of transmissions, where each transmission of the set of transmissions is based on a different gain parameter of the set of gain parameters, where each gain parameter of the set of gain parameters is based on a different channel state information parameter of the set of channel state information parameters, and where each gain parameter of the set of gain parameters is included in the set of gain parameters based on being less than a first threshold and greater than a second threshold.

A method for wireless communication at one or more network entities is described. The method may include obtaining, at the one or more network entities and from a user equipment (UE), a set of sounding reference signals, estimating a set of channel state information parameters, where each channel state information parameter of the set is based on a respective sounding reference signal of the set of sounding reference signals, and outputting, from at least one of the one or more network entities and to the UE, a set of transmissions, where each transmission of the set of transmissions includes a respective pseudo-noise signal that is based on a different gain parameter of a set of gain parameters, where each gain parameter of the set of gain parameters is based on a different channel state information parameter of the set of channel state information parameters, where each gain parameter of the set of gain parameters is included in the set of gain parameters based on being less than a first threshold and greater than a second threshold.

An apparatus for wireless communication at one or more network entities is described. The apparatus may include a processor, memory coupled with the processor, and instructions stored in the memory. The instructions may be executable by the processor to cause the apparatus to obtain, at the one or more network entities and from a UE, a set of sounding reference signals, estimate a set of channel state information parameters, where each channel state information parameter of the set is based on a respective sounding reference signal of the set of sounding reference signals, and outputting, from at least one of the one or more network entities and to the UE, a set of transmissions, where each transmission of the set of transmissions include a respective pseudo-noise signal that is based on a different gain parameter of a set of gain parameters, where each gain parameter of the set of gain parameters is based on a different channel state information parameter of the set of channel state information parameters, where each gain parameter of the set of gain parameters is included in the set of gain parameters based on being less than a first threshold and greater than a second threshold.

Another apparatus for wireless communication at one or more network entities is described. The apparatus may include means for obtaining, at the one or more network entities and from a UE, a set of sounding reference signals, means for estimating a set of channel state information parameters, where each channel state information parameter of the set is based on a respective sounding reference signal of the set of sounding reference signals, and means for outputting, from at least one of the one or more network entities and to the UE, a set of transmissions, where each transmission of the set of transmissions includes a respective pseudo-noise signal that is based on a different gain parameter of a set of gain parameters, where each gain parameter of the set of gain parameters is based on a different channel state information parameter of the set of channel state information parameters, where each gain parameter of the set of gain parameters is included in the set of gain parameters based on being less than a first threshold and greater than a second threshold.

A non-transitory computer-readable medium storing code for wireless communication at one or more network entities is described. The code may include instructions executable by a processor to obtain, at the one or more network entities and from a UE, a set of sounding reference signals, estimate a set of channel state information parameters, where each channel state information parameter of the set is based on a respective sounding reference signal of the set of sounding reference signals, and outputting, from at least one of the one or more network entities and to the UE, a set of transmissions, where each transmission of the set of transmissions include a respective pseudo-noise signal that is based on a different gain parameter of a set of gain parameters, where each gain parameter of the set of gain parameters is based on a different channel state information parameter of the set of channel state information parameters, where each gain parameter of the set of gain parameters is included in the set of gain parameters based on being less than a first threshold and greater than a second threshold.

In some examples of the method, apparatuses, and non-transitory computer-readable medium described herein, the one or more network entities include two or more network entities and the method, apparatuses, and non-transitory computer-readable medium may include further operations, features, means, or instructions for obtaining, at a first network entity of the two or more network entities and from each other network entity of the two or more network entities, a respective channel state information parameter of the set of channel state information parameters, where the set of gain parameters may be determined at the first network entity of the two or more network entities and outputting, from the first network entity and to respective network entities of the two or more network entities, a respective gain parameter of the set of gain parameters, where each gain parameter outputted to a respective network entity of the two or more network entities may be associated with the respective channel state information parameter obtained from the respective network entity.

In some examples of the method, apparatuses, and non-transitory computer-readable medium described herein, the one or more network entities include two or more network entities and the method, apparatuses, and non-transitory computer-readable medium may include further operations, features, means, or instructions for obtaining, at the first network entity and from at least one of the two or more network entities, an indication of a maximum pseudo-noise signal power, a minimum pseudo-noise signal power, or both, where first threshold may be based on obtaining the indication of the minimum pseudo-noise signal power, the second threshold may be based on receiving the maximum pseudo-noise signal power, or both.

Some examples of the method, apparatuses, and non-transitory computer-readable medium described herein may further include operations, features, means, or instructions for identifying a list of network entities, where the set of transmissions includes a transmission for each of the two or more network entities in the list of network entities, and where the list of network entities excludes at least one network entity of the two or more network entities based on the at least one network entity being associated with a channel strength below a threshold channel strength value or the first network entity failing to cluster the respective channel state information parameter associated with the at least one network entity with another channel state information parameter of the set of channel state information parameters.

In some examples of the method, apparatuses, and non-transitory computer-readable medium described herein, two or more of the set of sounding reference signals may be obtained at a first network entity of the one or more network entities at different frequencies, the first network entity outputs two or more of the set of transmissions, and at least one transmission of the two or more of the set of transmissions may be outputted at a different frequency from at least one other transmission of the two or more of the set of transmissions based on obtaining the two or more of the set of sounding reference signals at different frequencies.

In some examples of the method, apparatuses, and non-transitory computer-readable medium described herein, two or more of the set of sounding reference signals may be obtained at a first network entity of the one or more network entities over different beams, the first network entity outputs two or more of the set of transmissions, and at least one transmission of the two or more of the set of transmissions may be associated with a different beam than at least one other transmission of the two or more of the set of transmissions based on obtaining the two or more of the set of sounding reference signals over different beams.

In some examples of the method, apparatuses, and non-transitory computer-readable medium described herein, a first phase parameter associated with the first gain parameter may be based on a second phase parameter associated with the second gain parameter.

In some examples of the method, apparatuses, and non-transitory computer-readable medium described herein, the first phase parameter and the second phase parameter may be based on a third phase parameter associated with a third gain parameter of the set of gain parameters.

In some examples of the method, apparatuses, and non-transitory computer-readable medium described herein, the first phase parameter may be offset from the second phase parameter and the third phase parameter by 120 degrees and the second phase parameter may be offset from the third parameter by 120 degrees.

In some examples of the method, apparatuses, and non-transitory computer-readable medium described herein, the first phase parameter may be offset from the second phase parameter by 180 degrees.

In some examples of the method, apparatuses, and non-transitory computer-readable medium described herein, a first pseudo-noise signal associated with the first gain parameter and a second pseudo-noise signal associated with the second gain parameter each may have a higher magnitude than a third pseudo-noise signal associated with a combination of the first pseudo-noise signal and the second pseudo-noise signal at the UE.

In some examples of the method, apparatuses, and non-transitory computer-readable medium described herein, a first pseudo-noise signal associated with the first gain parameter, a second noise signal associated with the second gain parameter, and a third pseudo-noise signal associated with a third gain parameter each may have a higher magnitude than a fourth pseudo-noise signal associated with a combination of the first pseudo-noise signal, the second pseudo-noise, and the third pseudo-noise signal at the UE.

In some examples of the method, apparatuses, and non-transitory computer-readable medium described herein, each gain parameter may be associated with a respective amplitude parameter and a first amplitude parameter associated with a first gain parameter of the set of gain parameter may be based on a second amplitude parameter associated with a second gain parameter of the set of gain parameters. \

In some examples of the method, apparatuses, and non-transitory computer-readable medium described herein, the first amplitude parameter may have a same value as the second amplitude parameter and the first amplitude parameter may have a different value than a third amplitude parameter associated with a third gain parameter of the set of gain parameters.

In some examples of the method, apparatuses, and non-transitory computer-readable medium described herein, the first amplitude parameter may have a same value as a fourth amplitude parameter of the set of amplitude parameters.

A method for wireless communication at a UE is described. The method may include receiving, by the UE and from one or more network entities, a set of channel state information reference signals, estimating a set of channel state information parameters, where each channel state information parameter of the set is based on a respective channel state information reference signal of the set of channel state information reference signals, and transmitting, by the UE and to at least one of the one or more network entities, a set of transmissions, where each transmission of the set of transmissions includes a respective pseudo-noise signal that is based on a different gain parameter of a set of gain parameters, where each gain parameter of the set of gain parameters is based on a different channel state information parameter of the set of channel state information parameters, and where each gain parameter of the set of gain parameters is included in the set of gain parameters based on being less than a first threshold and greater than a second threshold.

An apparatus for wireless communication at a UE is described. The apparatus may include a processor, memory coupled with the processor, and instructions stored in the memory. The instructions may be executable by the processor to cause the apparatus to receive, by the UE and from one or more network entities, a set of channel state information reference signals, estimate a set of channel state information parameters, where each channel state information parameter of the set is based on a respective channel state information reference signal of the set of channel state information reference signals, and transmit, by the UE and to at least one of the one or more network entities, a set of transmissions, where each transmission of the set of transmissions includes a respective pseudo-noise signal that is based on a different gain parameter of a set of gain parameters, where each gain parameter of the set of gain parameters is based on a different channel state information parameter of the set of channel state information parameters, and where each gain parameter of the set of gain parameters is included in the set of gain parameters based on being less than a first threshold and greater than a second threshold.

Another apparatus for wireless communication at a UE is described. The apparatus may include means for receiving, by the UE and from one or more network entities, a set of channel state information reference signals, means for estimating a set of channel state information parameters, where each channel state information parameter of the set is based on a respective channel state information reference signal of the set of channel state information reference signals, and means for transmitting, by the UE and to at least one of the one or more network entities, a set of transmissions, where each transmission of the set of transmissions includes a respective pseudo-noise signal that is based on a different gain parameter of a set of gain parameters, where each gain parameter of the set of gain parameters is based on a different channel state information parameter of the set of channel state information parameters, and where each gain parameter of the set of gain parameters is included in the set of gain parameters based on being less than a first threshold and greater than a second threshold.

A non-transitory computer-readable medium storing code for wireless communication at a UE is described. The code may include instructions executable by a processor to receive, by the UE and from one or more network entities, a set of channel state information reference signals, estimate a set of channel state information parameters, where each channel state information parameter of the set is based on a respective channel state information reference signal of the set of channel state information reference signals, and transmit, by the UE and to at least one of the one or more network entities, a set of transmissions, where each transmission of the set of transmissions includes a respective pseudo-noise signal that is based on a different gain parameter of a set of gain parameters, where each gain parameter of the set of gain parameters is based on a different channel state information parameter of the set of channel state information parameters, and where each gain parameter of the set of gain parameters is included in the set of gain parameters based on being less than a first threshold and greater than a second threshold.

In some examples of the method, apparatuses, and non-transitory computer-readable medium described herein, the one or more network entities include two or more network entities and at least one of the set of channel state information reference signals may be received from a different network entity of the two or more network entities than another one of the set of channel state information reference signals.

In some examples of the method, apparatuses, and non-transitory computer-readable medium described herein, two or more of the set of channel state information reference signals may be received from a first network entity of the one or more network entities at different frequencies and at least one transmission of two or more of the set of transmissions may be output at a different frequency from at least one other transmission of the two or more of the set of transmissions based on receiving the two or more of the set of channel state information reference signals at different frequencies.

In some examples of the method, apparatuses, and non-transitory computer-readable medium described herein, two or more of the set of channel state information reference signals may be received from a first network entity of the one or more network entities over different beams and at least one transmission of two or more of the set of transmissions may be associated with a different beam than at least one other transmission of the two or more of the set of transmissions based on receiving the two or more of the set of channel state information reference signals over different beams.

Some examples of the method, apparatuses, and non-transitory computer-readable medium described herein may further include operations, features, means, or instructions for identifying a list of network entities, where the set of transmissions includes a transmission for each network entity in the list of network entities, where the list of network entities excludes at least one network entity of the one or more network entities and transmitting, to the at least one of the one or more network entities, an indication of the list of network entities.

In some examples of the method, apparatuses, and non-transitory computer-readable medium described herein, a first phase parameter associated with the first gain parameter may be based on a second phase parameter associated with the second gain parameter.

In some examples of the method, apparatuses, and non-transitory computer-readable medium described herein, the first phase parameter and the second phase parameter may be based on a third phase parameter associated with a third gain parameter of the set of gain parameters.

In some examples of the method, apparatuses, and non-transitory computer-readable medium described herein, the first phase parameter may be offset from the second phase parameter and the third phase parameter by 120 degrees and the second phase parameter may be offset from the third parameter by 120 degrees.

In some examples of the method, apparatuses, and non-transitory computer-readable medium described herein, the first phase parameter may be offset from the second phase parameter by 180 degrees.

In some examples of the method, apparatuses, and non-transitory computer-readable medium described herein, a first pseudo-noise signal associated with the first gain parameter and a second pseudo-noise signal associated with the second gain parameter each may have a higher magnitude than a third pseudo-noise signal associated with a combination of the first pseudo-noise signal and the second pseudo-noise signal at the at least one network entity of the one or more network entities.

In some examples of the method, apparatuses, and non-transitory computer-readable medium described herein, a first pseudo-noise signal associated with the first gain parameter, a second noise signal associated with the second gain parameter, and a third pseudo-noise signal associated with a third gain parameter each may have a higher magnitude than a fourth pseudo-noise signal associated with a combination of the first pseudo-noise signal, the second pseudo-noise, and the third pseudo-noise signal at the at least one network entity of the one or more network entities.

In some examples of the method, apparatuses, and non-transitory computer-readable medium described herein, each gain parameter may be associated with a respective amplitude parameter and a first amplitude parameter associated with a first gain parameter of the set of gain parameter may be based on a second amplitude parameter associated with a second gain parameter of the set of gain parameters.

In some examples of the method, apparatuses, and non-transitory computer-readable medium described herein, the first amplitude parameter may have a same value as the second amplitude parameter and the first amplitude parameter may have a different value than a third amplitude parameter associated with a third gain parameter of the set of gain parameters.

DETAILED DESCRIPTION

Figure 1:
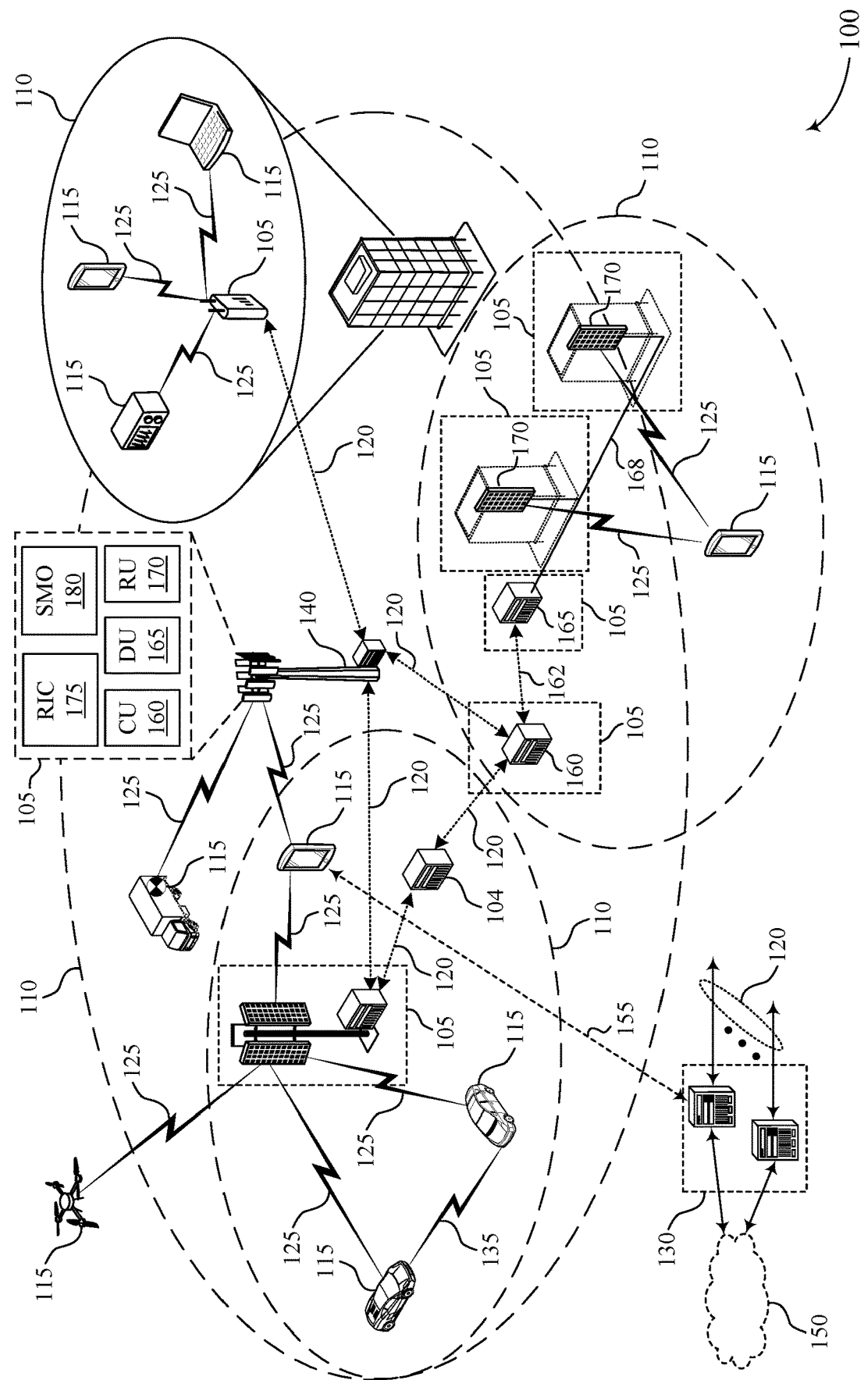
FIG. 1 illustrates an example of a wireless communications system that supports enhanced power control for pseudo-noise cancellation in accordance with one or more aspects of the present disclosure.

In some examples, to increase protection of secure messages, a transmitting device (e.g., a user equipment (UE) or a network entity, such as a transmission reception point (TRP)) or a set of transmitting devices (e.g., a set or cluster of network entities, such as TRPs) may generate multiple instances of pseudo-noise (e.g., artificial noise (AN)) to be transmitted with multiple secure messages. The multiple instances of pseudo-noise may be configured in a way that if a receiving device combines the multiple instances of pseudo-noise together after receiving the multiple secure messages, a magnitude of the combined instances of pseudo-noise may be lower than that of each individual instance of pseudo-noise (e.g., the instances of pseudo-noise may be self-canceling at the location of the receiving device). In some examples, the transmitting device or set of transmitting devices may estimate a channel state information (CSI) parameter (e.g., a channel strength parameter) for each secure message to be transmitted and may determine a gain parameter from each CSI parameter by which each secure message is to be amplified such that the pseudo-noise instances associated with each secure message cancel at the receiving device. However, if a magnitude of the gain parameter is estimated as too large, the pseudo-noise signal or a combination of the pseudo-noise signal and the corresponding secure message may have a transmit power that exceeds a threshold at the transmitting device or set of transmitting devices (e.g., that exceeds an amount of transmit power that the transmitting device or set of transmitting devices are capable of producing or that exceeds a configured or preconfigured transmitting power constraint). Additionally, or alternatively, if the gain parameter for the pseudo-noise signal is estimated as too small, the pseudo-noise signal may have a transmit power below a threshold amount for providing protection to the secure message. Accordingly, in such cases, the secure message may be intercepted.

The techniques described herein may enable the magnitude of the gain parameters to be limited to a range while still enabling the corresponding pseudo-noise signals to cancel with each other at the receiving device. For instance, the transmitting device or set of transmitting devices may receive a set of reference signals and may determine a CSI parameter for each of these reference signals. The transmitting device may cluster together the CSI parameters into groups of predetermined size (e.g., groups of 2 or 3) and may set the phases and amplitudes of the pseudo-noise signals for each cluster to cancel each other out. For instance, in a group of 2, the pseudo-noise signals may be set to have opposite phases (e.g., to be offset by $\pi$). Additionally, or alternatively, in a group of 3, the pseudo-noise signals may be set to be offset by $2\pi/3$ from each other. If the gain parameter for any of the CSI parameters in a cluster is to have a magnitude below a first threshold (e.g., a minimum threshold gain) or to have a magnitude above a second threshold (e.g., a maximum threshold gain), each of the CSI parameters in the cluster may be multiplied by a non-unit amplitude parameter when determining the gain parameter that limits the gain parameter to be larger than the first threshold and/or smaller than the second threshold. For instance, if the gain parameter for any of the CSI parameters in a cluster is determined to be below the first threshold, each of the CSI parameters for the cluster may be multiplied by an amplitude parameter with a magnitude greater than 1. Likewise, if the gain parameter for any of the CSI parameters in a cluster is determined to be above the second threshold, each of the CSI parameters for the cluster may be multiplied by an amplitude parameter with a magnitude below 1.

Aspects of the disclosure are initially described in the context of wireless communications systems. Additional aspects of the disclosure are described in the context of a gain parameter adjustment process and process flows. Aspects of the disclosure are further illustrated by and described with reference to apparatus diagrams, system diagrams, and flowcharts that relate to enhanced power control for pseudo-noise cancellation.

FIG. 1 illustrates an example of a wireless communications system 100 that supports enhanced power control for pseudo-noise cancellation in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c. F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support enhanced power control for pseudo-noise cancellation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IOT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, to increase protection of secure messages, a transmitting device (e.g., a UE 115 or a network entity 105, such as a TRP) or a set of transmitting devices (e.g., a set or cluster of network entities 105, such as TRPs) may generate multiple instances of pseudo-noise (e.g., AN) to be transmitted with multiple secure messages. The multiple instances of pseudo-noise may be configured in a way that if a receiving device combines the multiple instances of pseudo-noise together after receiving the multiple secure messages, a magnitude of the combined instances of pseudo-noise may be lower than that of each individual instance of pseudo-noise (e.g., the instances of pseudo-noise may be self-cancelling). In some examples, the transmitting device or set of transmitting devices may estimate a CSI parameter (e.g., a channel strength parameter) for each secure message to be transmitted and may determine a gain parameter from each CSI parameter by which each secure message is to be amplified such that the pseudo-noise instances associated with each secure message cancel at the receiving device. However, if the gain parameter is estimated as too large, the pseudo-noise signal or a combination of the pseudo-noise signal and the corresponding secure message may have a transmit power that exceeds a threshold at the transmitting device or set of transmitting devices (e.g., that exceeds an amount of transmit power that the transmitting device or set of transmitting devices are capable of producing or that exceeds a configured or preconfigured transmitting power constraint). Additionally, or alternatively, if the gain parameter for the pseudo-noise signal is estimated as too small, the pseudo-noise signal may have a have a transmit power below a threshold amount for providing protection to the secure message. Accordingly, in such cases, the secure message may be intercepted.

The techniques described herein may enable the magnitude of the gain parameters to be limited to a range while still enabling the corresponding pseudo-noise signals to cancel with each other at the receiving device. For instance, the transmitting device or set of transmitting devices may receive a set of reference signals and may determine a CSI parameter for each of these reference signals. The transmitting device may cluster together the CSI parameters into groups of predetermined size (e.g., groups of 2 or 3) and may set the phases of the pseudo-noise signals for each cluster to cancel each other out. For instance, in a group of 2, the pseudo-noise signals may be set to have opposite phases (e.g., to be offset by π). Additionally, or alternatively, in a group of 3, the pseudo-noise signals may be set to be offset by 2π/3 from each other. If the gain parameter for any of the CSI parameters in a cluster is to have a magnitude below a first threshold (e.g., a minimum threshold gain) or to have a magnitude above a second threshold (e.g., a maximum threshold gain), each of the CSI parameters in the cluster may be multiplied by an amplitude parameter when determining the gain parameter that limits the gain parameter to be larger than the first threshold and/or smaller than the second threshold. For instance, if the gain parameter for any of the CSI parameters in a cluster is determined to be below the first threshold, each of the CSI parameters for the cluster may be multiplied by an amplitude parameter with a magnitude greater than 1. Likewise, if the gain parameter for any of the CSI parameters in a cluster is determined to be above the second threshold, each of the CSI parameters for the cluster may be multiplied by an amplitude parameter with a magnitude below 1.

Figure 2:
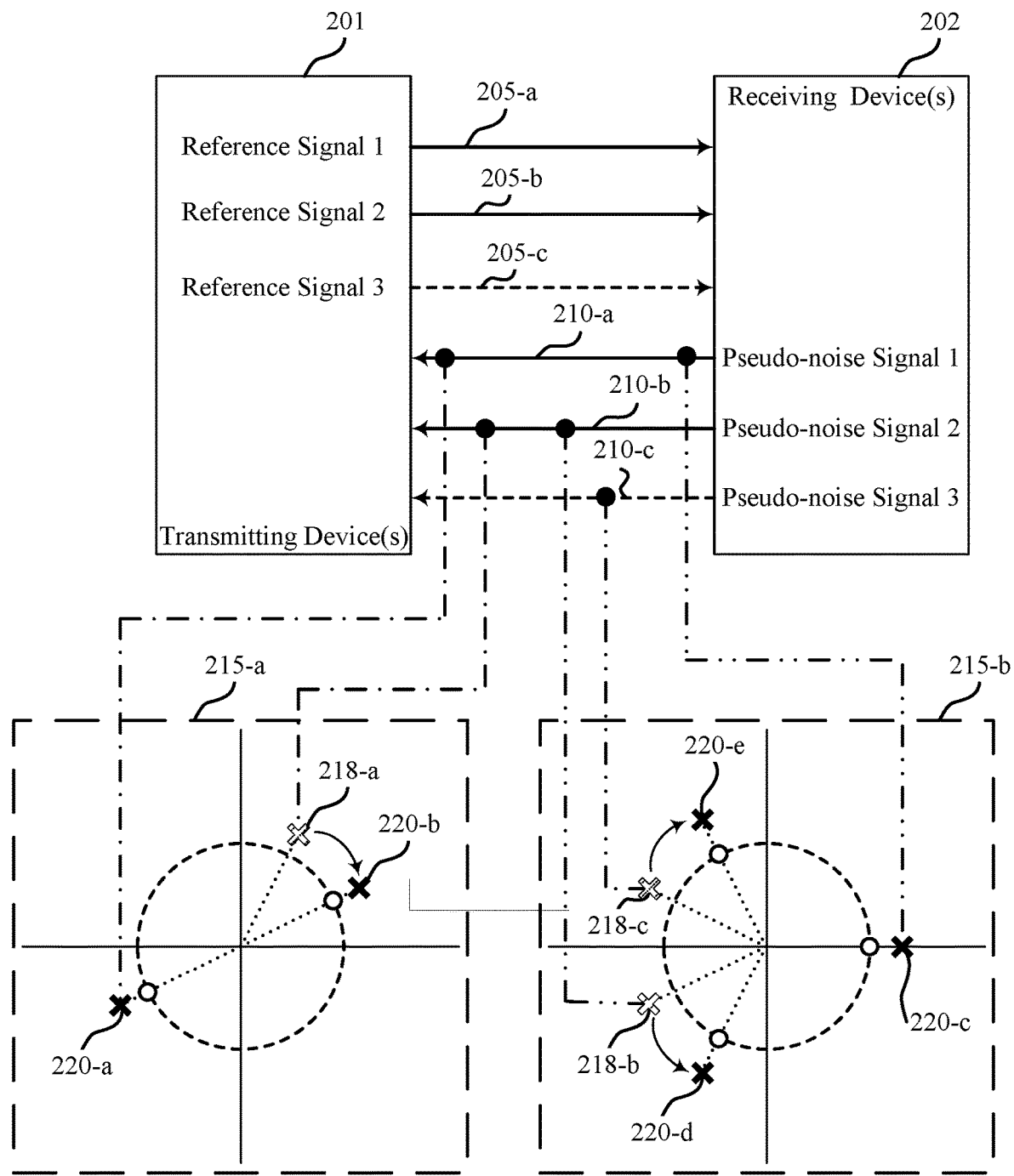
FIG. 2 illustrates an example of a wireless communications system that supports enhanced power control for pseudo-noise cancellation in accordance with one or more aspects of the present disclosure.

FIG. 2 illustrates an example of a wireless communications system 200 that supports enhanced power control for pseudo-noise cancellation in accordance with one or more aspects of the present disclosure. In some examples, wireless communications system 200 may implement one or more aspects of wireless communications system 100. Transmitting device(s) 201 and receiving device(s) 202 may each be an example of a UE 115, a network entity 105 (e.g., a TRP), or a set of network entities 105 (e.g., a set of TRPs) as described with reference to FIG. 1.

In some examples, performing AN cancellation for PHY channels (e.g., physical downlink control channel (PDCCH), physical downlink shared channel (PDSCH), physical uplink control channel (PUCCH), physical uplink shared channel (PUSCH)) may provide protection for messages transmitted in these physical channels. AN cancellation, for instance, may refer to a security technique (e.g., a PHY security technique) in which intentionally-impaired messages are transmitted with AN signals generated using CSI from an intended receiving device such that the AN signals cancel each other out at least partially at the intended receiving device and the intended receiving device may recover the messages. In some such examples, the messages and the corresponding AN signals may be transmitted in the same direction as each other. In some examples, AN cancellation schemes may involve either a single transmitting device (e.g., a single TRP) or multiple transmitting devices (e.g., multiple TRPs) transmitting multiple copies of AN-impaired messages at different times or via different frequencies or beams. In some such examples, the AN signal for each copy may be generated using the CSI of the intended receiver such that its contribution is canceled at least partially at the intended receiver after soft-combining all the received copies. Accordingly, an adversary may not be able to recover a confidential or secure message by processing one or multiple copies due to the AN part of each copy and an amplified AN part associated with soft-combined copies. The use of different beams (e.g., which may be referred to as spatial AN cancellation) to send multiple AN-impaired messages may enable fewer time-frequency resources to be utilized for transmitting the message and may accordingly, enable reduced deterioration of time and frequency resource utilization. To use spatial AN cancellation without the addition of multiple radio frequency (RF) chains, a cluster of transmitting devices (e.g., a cluster of TRPs) may be deployed to transmit the messages over a respective beam of each of the cluster of transmitting devices (e.g., a multi-TRP (mTRP)-assisted AN cancellation scheme).

However, some such AN cancellation schemes may involve performing absolute channel inversion on the AN signal (e.g., the pseudo-noise) for these messages, which may result in power levels for the AN signal that are below a first threshold (e.g., power levels insufficient for protecting a confidential or secure message) or that are above a second threshold (e.g., power levels too large to be used for transmission). Such AN cancellation schemes may be referred to as baseline power cancellation schemes. The techniques described herein may avoid absolute channel inversion by relaxing a dependency of AN power to channel quality.

In a first example, an nth message may be transmitted to a receiving device (e.g., over an nth time range, an nth frequency range, an nth beam, or by an nth TRP) and an nth message may be transmitted to the receiving device (e.g., over an mth time range, an mth frequency range, an mth beam, or by an mth TRP). In some such examples, nth message may have the form $a_n x_n + \beta_n$ and the mth message may have the form $a_m x_m + \beta_m$, where an and am may each correspond to a respective precoding vector, $x_n$ and $x_m$ may each correspond to a set of data symbols, and $\beta_n$ and $\beta_m$ may each correspond to an AN signal (e.g., for pseudo-noise). At the receiving device, the nth message may be received in the form $v^*_n h_n (a_n x_n + \beta_n)$ and the mth message may be received in the form $v^*_m h_m (a_m x_m + \beta_m)$, where $v^*_n$ and $v^*_m$ may each be a respective weight selected by the receiving device, and $h_n$ and $h_m$ may each be a respective CSI parameter measuring channel strength. In some examples, an nth received signal may be represented as $y_n = h_n (a_n x_n + \beta_n)$ and an mth received signal may be represented as $y_m = h_m (a_m x_m + \beta_m)$. Additionally, a combination of each received signal y at the receiving device may be represented as $y = \Sigma_{n=1}^{M} v^*_n y_n = v^*_1 h_1 (a_1 x_1 + \beta_1) + \ldots + v^*_M h_M (a_M x_M + \beta_M)$, which may also be expressed as a combined payload $v^*_1 h_1 a_1 x_1 + \ldots + v^*_M h_M a_M x_M$ with an aggregated AN $v^*_1 h_1 \beta_1 + \ldots + v^*_M h_M \beta_M$. In order to eliminate the aggregated AN, one technique (e.g., using a naïve power cancellation scheme), each term of the aggregated AN $v^*_n h_n \beta_n$ may be expressed using a unit-norm complex exponential $e^{j\theta_n}$, where $\theta_n$ may be a phase parameter, multiplied by a noise signal u (e.g., an arbitrary or unit-norm noise signal) common to all the terms. For instance, $$v_1^* h_1 \beta_1 + \ldots + v_M^* h_M \beta_M = \left(e^{j\theta_1} + \ldots + e^{j\theta_M}\right)u = 0 \rightarrow \beta_m = \frac{e^{j\theta_m}}{v_m^* h_m} u,$$

where $$\theta_m = (m-1)\frac{2\pi}{M} + \varphi,$$

were φ is a phase rotation (e.g., an arbitrary phase rotation) common to all terms. If performing maximum ratio combining (MRC), $v_m$ may be set equal to $h_m$ and consequently, $$\beta_m = \frac{e^{j\theta_m}}{|h_m|^2} u.$$

The magnitude of the gain parameter (e.g., AN magnitude) for the baseline power cancellation scheme may be given as $$|\beta_m| = \frac{|u|}{|h_m|^2},$$

which may change inversely with channel strength. If a channel is weak (e.g., the channel strength is below a first channel strength threshold value), the gain parameter may be large, which may result in a power budget not being sufficient to transmit both the secure message and the AN signal with the large power. In such examples, the transmitting device or set of transmitting devices may transmit only the AN signal or may refrain from participating in AN cancellation. Alternatively, if the power budget is not sufficient to transmit even the AN signal, the transmitting device may refrain from participating in AN cancellation. In order to avoid such scenarios when the channel is weak, the gain parameter may be limited to be below a maximum amount ($|\beta_m|<|\beta_{max}|$ for any m). If a channel is strong (e.g., the channel strength is above a second channel strength threshold value), the gain parameter may be small, which may result in the AN signal being insufficient to provide security protection (e.g., to hide the confidential or secure message). In such examples, a non-confidential message may be sent along with the AN signal; only the AN signal may be sent; or the transmitting device or set of transmitting devices may refrain from participating in the AN cancellation scheme. In order to avoid such scenarios when the channel is strong, the gain parameter may be limited to be above a minimum amount (e.g., $|\beta_m|>|\beta_{min}|$ for any m). If a first gain parameter (e.g., AN term) is too strong (e.g., greater than $|\beta_{max}|$) while a second gain parameter (e.g., AN term) is too weak (e.g., less than $|\beta_{min}|$), adjusting the power of noise signal u may only be capable of adjusting the first gain parameter or the second gain parameter to be greater than $|\beta_{min}|$ and less than $|\beta_{max}|$.

The techniques described herein may enable a power allocation technique for AN cancellation which relaxes a dependency of AN power (e.g., of gain parameters) to channel quality or channel strength (e.g., to CSI parameters) and may, thus, avoid performing absolute channel inversion. The techniques may apply to any type of AN cancellation scheme. For instance, the techniques may be applied for time-based AN cancellation, in which reference signals for estimating the CSI parameters are transmitted over different (e.g., non-overlapping) time slots. Additionally, the techniques may be applied for frequency-based AN cancellation, in which reference signals for estimating the CSI parameters are transmitted over different (e.g., non-overlapping) frequency ranges. Additionally, the techniques may be applied for spatial-based AN cancellation, in which reference signals for estimating the CSI parameters are transmitted over different beams. Additionally, the techniques may be applied for mTRP-assisted AN cancellation, in which the reference signals for estimating the CSI parameters are transmitted from different network entities or different TRPs.

As described herein, baseline power cancellation schemes may involve leaving out TRPs, time slots, frequencies, or beams whose corresponding gain parameters (e.g., corresponding AN powers) are above $|\beta_{max}|$ or below $|\beta_{min}|$. A generalized scheme (e.g., solution) utilizing a sum of complex exponentials with non-unit magnitudes for at least some of the exponential terms may enable at least some such of these TRPs, time slots, frequencies, or beams to be used for transmitting secure or confidential messages. For instance, $$v_1^* h_1 \beta_1 + \ldots + v_M^* h_M \beta_M = (\gamma_1 e^{j\theta_1} + \ldots + \gamma_M e^{j\theta_M})u = 0 \rightarrow \beta_m = \gamma_m \frac{e^{j\theta_m}}{v_m^* h_m} u.$$

In examples in which MRC is being performed, the magnitude of $\beta_m$ may be simplified to have the form $$|\beta_m| = \gamma_m \frac{|u|}{|h_m|^2},$$

where at least partially break the dependency of the gain parameter (e.g., AN power) solely on the channel strength. For instance, the gain parameter may be adjusted via amplitude parameter $\gamma_m$ to compensate for adverse effects of too weak (e.g., small $|h_m|$) and/or too strong (e.g., large $|h_m|$) channels.

In some examples, the values of the coefficients (e.g., amplitude parameters) $\gamma_1, \ldots \gamma_M$ may be determined using a single equation (e.g., a generalized scheme). One technique for determining these coefficients may involve starting from the baseline scheme (e.g., $\gamma_1 = \ldots = \gamma_M = 1$) and choosing the coefficient $\gamma_m$ such that the respective gain parameter (e.g., AN magnitude) $|\beta_m|$ falls into an interval between $|\beta_{min}|$ and $|\beta_{max}|$. In response to this change, at least one other gain parameter (e.g., AN term) $\beta_n$ may be adjusted as well via its coefficient (e.g., amplitude parameter) $\gamma_n$ in order to keep the summation of the baseline solution the same (e.g., to keep the summation at 0. For instance, $|h_1|^2 \beta_1 + \ldots |h_m|^2 \beta_m + \ldots |h_n|^2 \beta_n + \ldots + |h_M|^2 \beta_M = (\gamma_1 e^{j\theta_1} + \ldots \gamma_m e^{j\theta_m} + \ldots \gamma_n e^{j\theta_n} + \ldots + \gamma_M e^{j\theta_M})u=0$. Accordingly, if $\gamma_m$ increases, then $\gamma_n$ may also increase or, if $\gamma_m$ decreases, then $\gamma_n$ may also decrease. Additionally, $\theta_n$ may be chosen to compensate for the change of $\gamma_m$. The phases of the exponentials may be assigned to AN terms (e.g., gain parameters) randomly in the baseline scheme. However, in the generalized solution, the phase parameters may be selected to enable cancellation of AN contributions. In some examples, $\gamma_m$ and $\gamma_n$ may be coefficients (e.g., amplitude parameters) with similar channel strengths (e.g., coefficients with the most similar channel strengths as compared to other coefficients within $\gamma_1, \ldots, \gamma_M$). For instance, if both $\gamma_m$ and $\gamma_n$ are increasing, then both $|h_m|$ and $|h_n|$ may be similarly large or, if both $\gamma_m$ and $\gamma_n$ are decreasing, then both $|h_m|$ and $|h_n|$ may be similarly small.

If the number of coefficients (e.g., amplitude parameters) $\gamma_1, \ldots, \gamma_M$ is even, the coefficients may be clustered into pairs of 2, where a common $\gamma$ may be assigned for each pair of 2 with similar channel quality (e.g., similar CSI parameter values) to ensure that AN magnitudes (e.g., the magnitude of the gain parameters) are within the interval between $|\gamma_{min}|$ and $|\beta_{max}|$. For instance, coefficients whose corresponding CSI parameters (e.g., $|h_m|^2$) are large may be clustered or paired together and set to a common $\gamma$ greater than 1 such that $|\beta_m|>|\beta_{min}|$. Additionally, coefficients whose corresponding CSI parameters (e.g., $|h_m|^2$) are small, may be clustered or paired together and set to a common $\gamma$ less than 1 such that $|\beta_m|<|\beta_{max}|$. Additionally, the phases of these pairs (e.g., the phase parameters) may be set such that they are apart by $\pi$ (e.g., out of phase). In one example, in which $h_m$ and $h_n$ are clustered or paired together, $\gamma_m e^{j\theta_m} + \gamma_n e^{j\theta_n} = 0$, where $\gamma_m = \gamma_n = \gamma$ and $\theta_m = \theta_n + \pi \pmod{2\pi}$, and where $$\theta_m = (m-1)\frac{2\pi}{M} + \varphi.$$

If the number of coefficients (e.g., amplitude parameters) $\gamma_1, \ldots, \gamma_M$ is odd, no out-of-phase pairs may be in the original phase set produced by $$\theta_m = (m-1)\frac{2\pi}{M} + \varphi.$$

In some such examples, the gain parameters (e.g., AN terms) may be grouped into groups of 2 and 3 based on channel-quality similarity (e.g., similar CSI parameter values). For instance, there each group may be a group of 2 except for one group of 3. Alternatively, there may be more than one group of 3. For the groups of 2, the common $\gamma$ may be utilized and the phase parameters may be set such that they are apart by $\pi$ at random phase values. For the groups of 3, the common $\gamma$ may also be utilized and the phase parameters may be set such that they are apart by $2\pi/3$). In one example, in which $h_m$, $h_n$, and $h_p$ are clustered or paired together, $\gamma_m e^{j\theta_m} + \gamma_n e^{j\theta_n} + \gamma_p e^{j\theta_p} = 0$, where $\gamma_m = \gamma_n = \gamma_p = \gamma$ and $\theta_m = \theta_n + 2\pi/3$ (mod $2\pi$) and $\theta_p = \theta_n + 4\pi/3$ (mod $2\pi$), and where $$\theta_m = (m-1)\frac{2\pi}{M} + \varphi.$$

In an example, transmitting device(s) 201 may communicate with receiving device(s) 202. For instance, transmitting device(s) 201 may transmit reference signals 205-$a$ and 205-$b$ to receiving device(s) 202. In some examples, reference signals 205-$a$ and 205-$b$ may be transmitted from a same device (e.g., transmitting device(s) 201 includes a single UE, network entity, or TRP) and may be transmitted over different time slots, different frequency ranges, different beams, or a combination thereof. In some such examples in which reference signals 205-$a$ and 205-$b$ are transmitted over different beams and receiving device(s) 202 includes multiple TRPs, receiving device(s) 202 may receive reference signals 205-$a$ and 205-$b$ at different TRPs of the multiple TRPs. In other examples in which transmitting device(s) 201 includes multiple TRPs of a set of TRPs, reference signals 205-$a$ and 205-$b$ may be transmitted from different TRPs of the multiple TRPs. Additionally, in some examples, transmitting device(s) 201 may transmit reference signal 205 to receiving device(s) 202.

Receiving device(s) 202 may estimate a set of CSI parameters (e.g., $h_m$) from the received reference signals. For instance, receiving device(s) 202 may estimate a first CSI parameter associated with reference signal 205-$a$ and a second CSI parameter associated with reference signal 205-$b$. In examples in which receiving device(s) 202 receive reference signal 205-$c$, receiving device(s) 202 may estimate a third CSI parameter associated with reference signal 205-$c$.

After estimating the set of CSI parameters, receiving device(s) 202 may determine a set of gain parameters (e.g., $\beta_m$), where each gain parameter of the set of gain parameters is based on a different CSI parameter of the set of CSI parameters, and where each gain parameter is included in the set of gain parameters based on being less than a first threshold (e.g., $\beta_{max}$) and greater than a second threshold (e.g., $\beta_{min}$). For instance, if receiving device(s) 202 receives an even number of reference signals, with two reference signals 205-$a$ and 205-$b$ having a similar value for the first and second CSI parameters, receiving device(s) 202 may cluster the first and second CSI parameters together. If the first and second CSI parameters have values small or large enough such that corresponding gain parameters (e.g., a first and second gain parameter, respectively) are less than the first threshold and greater than the second threshold, an amplitude parameter (e.g., a common coefficient $\gamma$) for these CSI parameters may be set to 1. However, if the CSI parameters have values small enough or large enough such that the corresponding gain parameters are greater than the first threshold or less than the second threshold, the amplitude parameter for these CSI parameters may be set to a value greater than 1. Additionally, the phase associated with the first gain parameter and the second gain parameter may be set to be offset by $\pi$. For instance, as depicted in adjustment scheme 215-$a$, a phase of an initial value 218-$a$ of the second gain parameter may be adjusted such that another value 220-$b$ of the second gain parameter is produced, where the value 220-$b$ of the second gain parameter is offset by $\pi$ from the value 220-$a$ of the first gain parameter. After performing the adjusting, receiving device(s) 202 may transmit a first secure message with pseudo-noise signal 210-$a$ and a second secure message with pseudo-noise signal 210-$b$, where pseudo-noise signal 210-$a$ and 210-$b$ may be transmitted according to the value 220-$a$ of the first gain parameter and the value 220-$b$ of the second gain parameter, respectively.

If receiving device(s) receives an odd number of reference signals, with three reference signals 205-$a$, 205-$b$, and 205-$c$ have a similar value for the first, second, and third CSI parameters, receiving device(s) 202 may cluster the first, second, and third CSI parameters together. If the first, second, and third CSI parameters have values small or large enough such that corresponding gain parameters (e.g., a first and second gain parameter, respectively) are less than the first threshold and greater than the second threshold, an amplitude parameter (e.g., a common coefficient $\gamma$) for these CSI parameters may be set to 1. However, if the CSI parameters have values small enough or large enough such that the corresponding gain parameters are greater than the first threshold or less than the second threshold, the amplitude parameter for these CSI parameters may be set to a value greater than 1. Additionally, the phase associated with the first, second, and third gain parameters may be set to be offset from each other by $2\pi/3$. For instance, as depicted in adjustment scheme 215-$b$, a phase of an initial value 218-$b$ of the second gain parameter may be adjusted such that another value 220-$d$ of the second gain parameter is produced and a phase of an initial value 218-$c$ of the third gain parameter may be adjusted such that another value 220-$e$ of the third gain parameter is produced, where the value 220-$d$ of the second gain parameter, the value 220-$e$ of the third gain parameter, and the value 220-$c$ of the first gain parameter are offset from each other by $2\pi/3$. After performing the adjusting, receiving device(s) 202 may transmit a first secure message with pseudo-noise signal 210-$a$, a second secure message with pseudo-noise signal 210-$b$, and a third secure message with pseudo-noise signal 210-$c$, pseudo-noise signals 210-$a$, 210-$b$, and 210-$c$ may be transmitted according to the value 220-$c$ of the first gain parameter, the value 220-$d$ of the second gain parameter, and the value 220-$e$ of the third gain parameter, respectively.

In some examples, transmitting device(s) 201 may include a set of network entities (e.g., TRPs) and receiving device(s) 202 may include a UE. In some such examples, a corresponding power control scheme may have CSI be available for each occasion of an AN-impaired message, such as for mTRP-assisted AN cancellation in the downlink. In some such examples, a master network entity (e.g., a master TRP, a base station) of the set of network entities sends an indication to the UE to initiate the procedure. The UE may transmit sounding reference signals (SRSs) (e.g., reference signals 205-a, 205-b, and 205-c may be SRSs in the present example) to one or more of the set of network entities (e.g., any of the set of network entities within a communication range of the UE). Each network entity that receives an SRS may estimate its CSI (e.g., estimate the CSI parameter) using the received SRS and may share the estimate CSI with the master network entity (e.g., over Xn). Each such network entity, in some examples, may share minimum or maximum allowable AN power values (e.g., respective minimum and maximum values for $|\beta_{min}|$ and $|\beta_{max}|$), such as in cases when the network entities are of different types. The master network entity may execute the power control scheme. For instance, the master network entity may consider each other network entity of the set of network entities from which CSI has been received or may consider a subset (e.g., based on channel strength). If the master network entity finds a solution for the amplitude and phase of each AN signal (e.g., each pseudo-noise transmission), the master network entity may configure participating network entities by sending at least amplitude and phase of AN terms to these network entities (e.g., over Xn). If the master network entities fails to find a solution, the master network entity may remove one or more network entities from the participating network entities and may repeat the process of attempting to find a solution. In each such repetition, network entities with weakest channels or those that cannot be clustered with other network entities may be based on channel similarity may be removed.

In other examples, transmitting device(s) may include a single network entity (e.g., a single TRP) and receiving device(s) 202 may include a UE. In some such examples, the UE may transmit SRSs (e.g., reference signals 205-a, 205-b, and 205-c may be SRSs in the present example) to the single network entity over different time slots, frequency ranges, or beams. If multiple copies of an AN-impaired message are transmitted over a same time range (e.g., due to the pseudo-noise transmissions being transmitted over different beams and/or different frequency ranges), the maximum AN power (e.g., $|\beta_{max}|$) may be selected according to a total number of pseudo-noise signals being transmitted over that same time range (e.g., according to a common power budget).

In yet other examples, transmitting device(s) may include a UE and receiving device(s) 202 may include one or more network entities (e.g., one or more TRPs). For instance, a first of the one or more network entities (e.g., a base station) may transmit an indication to any others of the one or more network entities that are within a communication range of the UE. The one or more network entities may transmit channel state information reference signals (CSI-RSs) to the UE in the downlink. The UE may use the received CSI-RSs to estimate the channel for the one or more network entities and the first of the one or more network entities and the UE may signal to each other an indication of a power control scheme (e.g., the generalized scheme described herein as compared to the naïve scheme). In some such examples, the UE may perform the power control. Additionally, the UE may not use each of the one or more network entities from which it has received CSI-RSs and may send information indicating which of the one or more network entities the UE is using (e.g., selected or grouped network entities) to the first of the one or more network entities. The UE may transmit to multiple network entities of the one or more network entities after adding pseudo-noise (e.g., artificial noise) on top of a secure or confidential message. The first of the one or more network entities may employ the one or more network entities (e.g., those indicated by the UE) to soft-combine the AN-impaired messages.

It should be noted that there may be examples in which time-based AN cancellation, frequency-based AN cancellation, or spatial-domain AN cancellation may be used with multiple network entities. For instance, reference signals 205-a and 205-b may be received from a first TRP over different time slots, frequencies, or beams and reference signal 205-c may be received from a second TRP. Similarly, the UE may transmit reference signals 205-a and 205-b to a first TRP over different time slots, frequencies, or beams and may transmit reference signal 205-c to a second TRP.

In some examples, the techniques described herein may have one or more advantages. For instance, adjusting the AN power (e.g., gain parameters) using coefficients (e.g., amplitude parameters) may enable time slots, frequencies, beams, or network entities (e.g., TRPs) whose CSI (e.g., CSI parameters) had a value too high or too low to still be used in communicating secure messages while using a naïve scheme.

Figure 3:
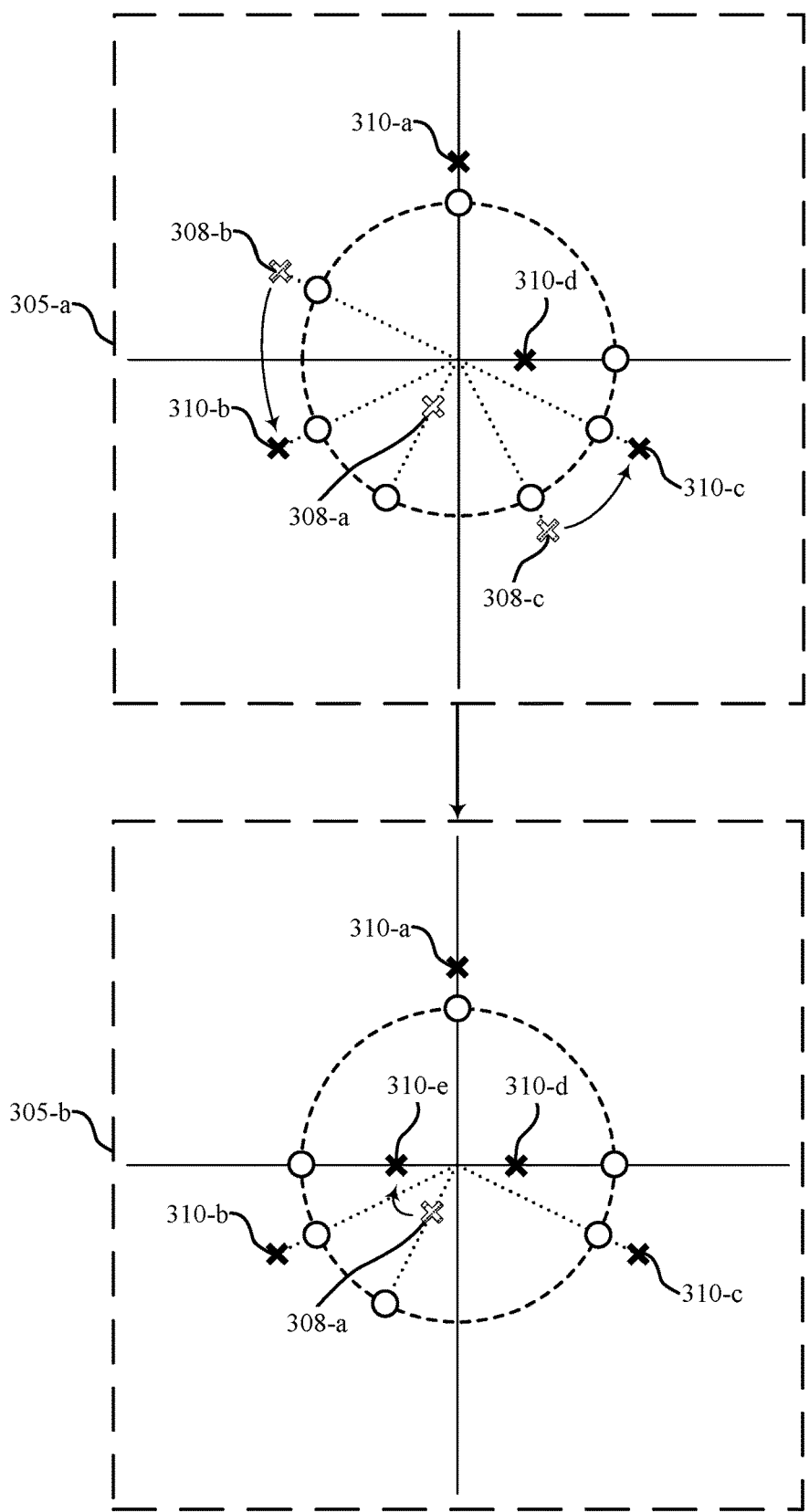
FIG. 3 illustrates an example of a gain parameter adjustment process that supports enhanced power control for pseudo-noise cancellation in accordance with one or more aspects of the present disclosure.

FIG. 3 illustrates an example of a gain parameter adjustment process 300 that supports enhanced power control for pseudo-noise cancellation in accordance with one or more aspects of the present disclosure. In some examples, gain parameter adjustment process 300 may illustrate a process performed by transmitting device(s) 201 as described with reference to FIG. 2. For instance, gain parameter adjustment process 300 may illustrate transmitting device(s) 201 adjusting phases of a gain parameter as described herein to enable corresponding AN signals (e.g., pseudo-noise) to cancel out with each other.

At 305-a, a first, second, and third CSI parameter may be determined to have similar values and may be grouped together. A phase of an initial value 308-b of a second gain parameter corresponding to the second CSI parameter may be adjusted to the adjusted value 310-b and a phase of an initial value 308-c of a third gain parameter corresponding to the third CSI parameter may be adjusted to the adjusted value 310-c. In this manner, a value 310-a of a first gain parameter corresponding to the first CSI parameter may be offset from the value 310-b of the second gain parameter and the value 310-c of the third gain parameter by $2\pi/3$. Additionally, if any of the first CSI parameter, the second CSI parameter, or the third CSI parameter have a small value (e.g., the channel strength is weak), the corresponding gain parameters may include a common amplitude parameter (e.g., coefficient) $\gamma$ whose magnitude is less than 1 such that first, second, and third gain parameters are below $|\beta_{max}|$. Elsewise, the common amplitude parameter may have a magnitude of 1.

At 305-b, a fourth and fifth CSI parameter may be determined to have similar values and may be grouped together. A phase of an initial value 308-a of a fourth gain parameter corresponding to the fourth CSI parameter may be adjusted to the adjusted value 310-e. In this manner, a value 310-d of a fifth gain parameter corresponding to the fifth CSI parameter may be offset from the value 310-e of the fourth gain parameter by $\pi$. Additionally, if either the fourth CSI parameter or the fifth CSI parameter have a large value (e.g., the channel strength is strong), the corresponding gain parameters may include a common amplitude parameter (e.g., coefficient) $\gamma$ whose magnitude is greater than 1 such that the fourth and fifth gain parameters are above $|\beta_{min}|$. Elsewise, the common amplitude parameter may have a magnitude of 1.

Figure 4:
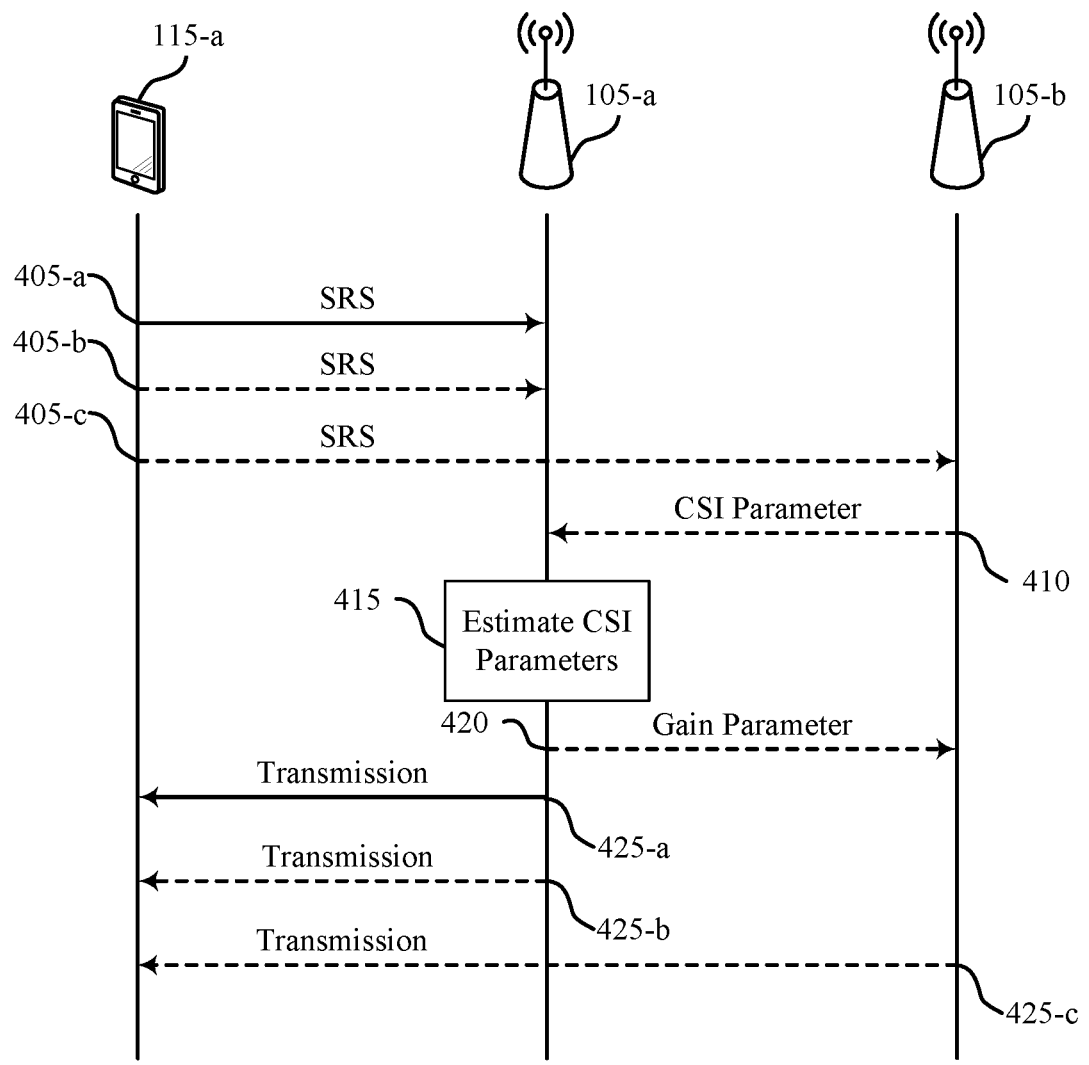
FIG. 4 illustrates an example of a process flow that supports enhanced power control for pseudo-noise cancellation in accordance with one or more aspects of the present disclosure.

FIG. 4 illustrates an example of a process flow 400 that supports enhanced power control for pseudo-noise cancellation in accordance with one or more aspects of the present disclosure. In some examples, process flow 400 may be implemented by one or more aspects of wireless communications systems 100 and/or 200. For instance, network entities 105-a and 105-b may be examples of a network entity 105 as described with reference to FIG. 1 or transmitting device(s) 201 as described with reference to FIG. 2. Additionally, or alternatively, UE 115-a may be an example of a UE 115 as described with reference to FIG. 1 or receiving device(s) 202 as described with reference to FIG. 2.

At 405-a, network entity 105-a may obtain a first SRS of a set of SRSs from UE 115-a. At 405-b, network entity 105-a may obtain a second SRS of a set of SRSs from UE 115-a. At 405-c, network entity 105-b may obtain a third SRS of a set of SRSs from UE 115-a. In some examples, the first SRS and the second SRS may be obtained at different frequencies. In some examples, the first SRS and the second SRS may be obtained over different beams.

At 410, network entity 105-a may obtain, from network entity 105-b (e.g., from each network entity of a set of network entities), a respective CSI parameter of the set of CSI parameters. For instance, network entity 105-a may obtain, from network entity 105-b, a CSI parameter estimated from the third SRS of the set of SRSs. In some examples, network entity 105-a may obtain, from network entity 105-b (e.g., from each network entity of the set of network entities), a maximum pseudo-noise signal power (e.g., a value equal to or associated with $|\beta_{max}|$), a minimum pseudo-noise signal power (e.g., a value equal to or associated with $|\beta_{min}|$), or both.

At 415, network entity 105-a may estimate a set of CSI parameters, where each CSI parameter of the set is based on a respective SRS of the set of SRSs.

At 420, network entity 105-a may output, to network entity 105-b (e.g., to each network entity of the set of network entities), a respective gain parameter of a set of gain parameters, where each gain parameter outputted to network entity 105-b is associated with the respective CSI parameter obtained from the respective network entity. Each gain parameter of the set of gain parameters may be based on a different CSI parameter of the set of CSI parameters. Additionally, each gain parameter of the set of gain parameters may be included in the set of gain parameters based on being less than a first threshold (e.g., $|\beta_{max}|$) and greater than a second threshold (e.g., $(\beta_{min})$). In some examples, the first threshold may be based on obtaining the indication of the pseudo-noise signal power and the second threshold may be based on receiving the indication of the minimum pseudo-noise signal power.

In some examples, a first phase parameter associated with the first gain parameter may be based on a second phase parameter associated with the second gain parameter. In some examples, the first phase parameter and the second phase parameter may be based on a third phase parameter associated with a third gain parameter of the set of gain parameters. In some examples, the first phase parameter may be offset from the second phase parameter and the third phase parameter by 120 degrees, and the second parameter may be offset from the third parameter by 120 degrees. In some examples, the first phase parameter may be offset from the second phase parameter by 180 degrees.

In some examples, each gain parameter may be associated with a respective amplitude parameter, where a first amplitude parameter associated with a first gain parameter of the set of gain parameters is based on a second amplitude parameter associated with a second gain parameter of the set of gain parameters. In some examples, the first amplitude parameter has a same value as a second amplitude parameter, where the first amplitude parameter has different value than a third amplitude parameter associated with a third gain parameter of the set of gain parameters. In some examples, the first amplitude parameter has a same value as a fourth amplitude parameter of the set of amplitude parameters.

At 425-a, network entity 105-a may output, to UE 115-a, a first transmission of a set of transmissions. At 425-b, network entity 105-a may output, to UE 115-a, a second transmission of the set of transmissions. At 425-c, network entity 105-b may output, to UE 115-a, a third transmission of the set of transmissions. Each transmission of the set of transmissions may be based on a different gain parameter of a set of gain parameters. In some examples, network entity 105-a may identify a list of network entities, where the set of transmissions include a transmission for each network entity on the list of network entities (e.g., network entity 105-a), and where the list of network entities excludes at least one network entity (e.g., network entity 105-b if network entity 105-a determines to not output the respective gain parameter to network entity 105-b). The list of network entities may exclude the at least one network entity based on the at least one network entity being associated with a channel strength below a threshold channel strength value or the first network entity failing to cluster the respective CSI parameter associated with the at least one network entity with another CSI parameter of the set of CSI parameters.

In some examples, the first transmission and the second transmission may be outputted at different frequencies (e.g., a first frequency and a second frequency) based on obtaining the first SRS at the first frequency at 405-a and obtaining the second SRS at the second frequency at 405-b. In some examples, the first transmission and the second transmission may be outputted over different beams (e.g., a first beam and a second beam) based on obtaining the first SRS over a different beam from the second SRS (e.g., the first beam and the second beam, respectively).

In some examples, a first pseudo-noise signal associated with the first gain parameter and a second pseudo-noise signal associated with the second gain parameter each may have a higher magnitude than a third pseudo-noise signal associated with a combination of the first pseudo-noise signal and the second pseudo-noise signal at UE 115-a. In some examples, a first pseudo-noise signal associated with the first gain parameter, a second pseudo-noise signal associated with the second gain parameter, and a third pseudo-noise signal associated with the third gain parameter may each have a higher magnitude than a fourth pseudo-noise signal associated with a combination of the first pseudo-noise signal, the second pseudo-noise signal, and the third pseudo-noise signal.

Figure 5:
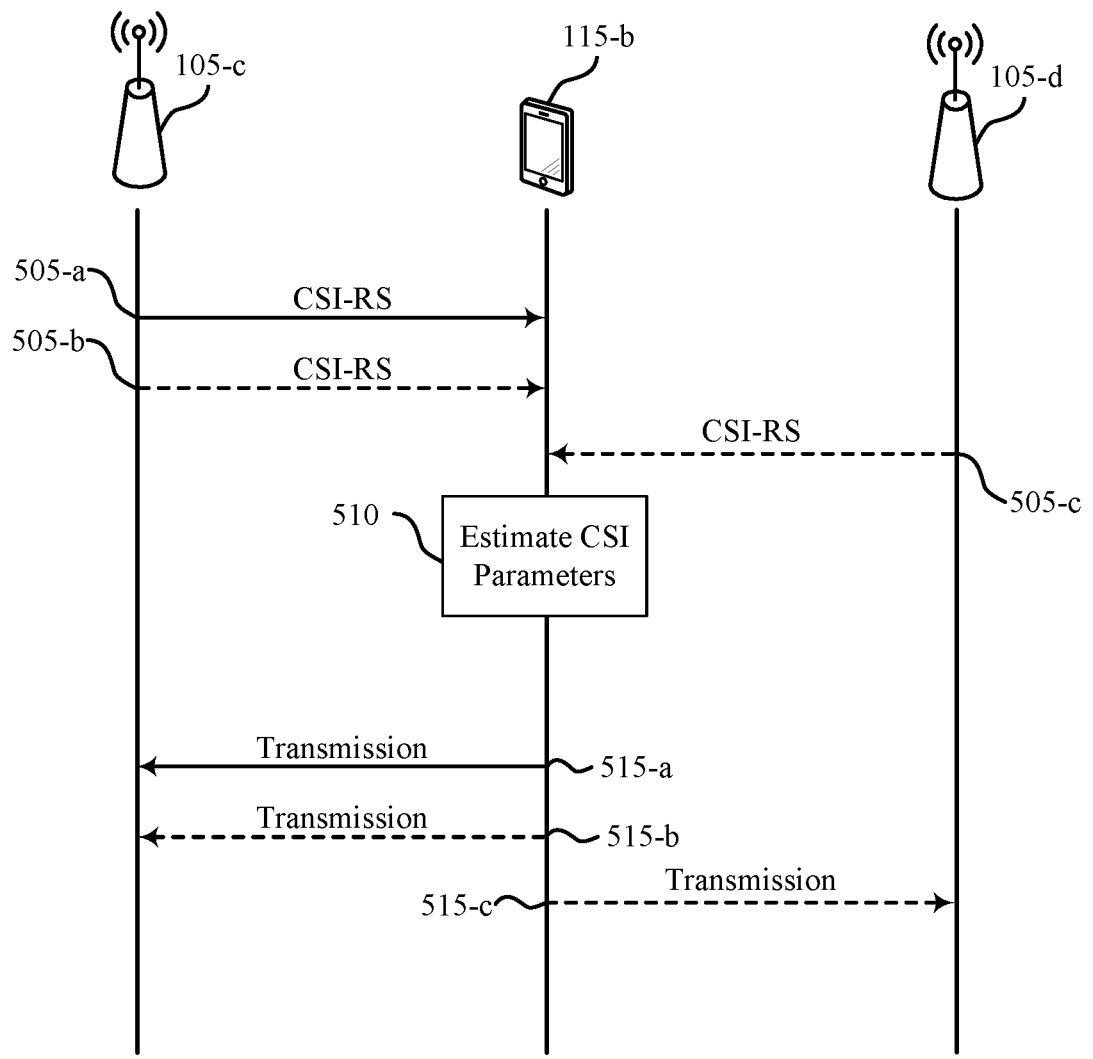
FIG. 5 illustrates an example of a process flow that supports enhanced power control for pseudo-noise cancellation in accordance with one or more aspects of the present disclosure.

FIG. 5 illustrates an example of a process flow 500 that supports enhanced power control for pseudo-noise cancellation in accordance with one or more aspects of the present disclosure. In some examples, process flow 500 may be implemented by one or more aspects of wireless communications systems 100 and/or 200. For instance, network entities 105-c and 105-d may be examples of a network entity 105 as described with reference to FIG. 1 or receiving device(s) 202 as described with reference to FIG. 2. Additionally, or alternatively, UE 115-b may be an example of a UE 115 as described with reference to FIG. 1 or transmitting device(s) 201 as described with reference to FIG. 2.

At 505-a, network entity 105-c may output a first CSI-RS of a set of CSI-RSs to UE 115-b. At 505-b, network entity 105-c may output a second CSI-RS of a set of CSI-RSs to UE 115-b. At 505-c, network entity 105-d may output a third CSI-RS of a set of CSI-RSs to UE 115-b. In some examples, the first CSI-RS and the second CSI-RS may be output at different frequencies. In some examples, the first CSI-RS and the second CSI-RS may be associated with different beams (e.g., received by UE 115-b over different beams or output from network entity 105-c over different beams).

At 510, 115-b may estimate a set of CSI parameters, where each CSI parameter of the set is based on a respective CSI-RS of the set of CSI-RSs.

At 515-a, UE 115-b may transmit a first transmission of a set of transmissions to network entity 105-c. At 515-b, UE 115-b may transmit a second transmission of the set of transmissions to network entity 105-c. At 515-c, UE 115-b may transmit a third transmission of the set of transmissions to network entity 105-d. In some examples, each transmission of the set of transmissions may include a respective pseudo-noise signal that is based on a different gain parameter of a set of gain parameters. In some examples, each gain parameter of the set of gain parameter is based on a different CSI parameter of the set of CSI parameters. In some examples, each gain parameter of the set of gain parameters is included in the set of gain parameters based on being less than a first threshold (e.g., |β_max|) and greater than a second threshold (e.g., |β_min|). In some examples, the first transmission and the second transmission may be transmitted at different frequencies (e.g., a first frequency and a second frequency) based on receiving the first CSI-RS at the first frequency at 505-a and receiving the second CSI-RS at the second frequency at 505-b. In some examples, the first transmission and the second transmission may be outputted over different beams (e.g., a first beam and a second beam) based on obtaining the first CSI-RS over a different beam from the second CSI-RS (e.g., the first beam and the second beam, respectively).

In some examples, UE 115-b may identify a list of network entities, where the set of transmissions include a transmission for each network entity in the list of network entities (e.g., network entity 105-c), and where the list of network entities excludes at least one network entity of the one or more network entities (e.g., network entity 105-d in examples in which UE 115-b does not receive the third CSI-RS from network entity 105-d at 505-c). In some examples, UE 115-b may transmit an indication of the list of network entities to a network entity (e.g., network entity 105-c or network entity 105-d).

In some examples, a first phase parameter associated with the first gain parameter may be based on a second phase parameter associated with the second gain parameter. In some examples, the first phase parameter and the second phase parameter may be based on a third phase parameter associated with a third gain parameter of the set of gain parameters. In some examples, the first phase parameter may be offset from the second phase parameter and the third phase parameter by 120 degrees, and the second parameter may be offset from the third parameter by 120 degrees. In some examples, the first phase parameter may be offset from the second phase parameter by 180 degrees.

In some examples, a first pseudo-noise signal associated with the first gain parameter and a second pseudo-noise signal associated with the second gain parameter each may have a higher magnitude than a third pseudo-noise signal associated with a combination of the first pseudo-noise signal and the second pseudo-noise signal at least one network entity of one or more network entities (e.g., network entity 105-c or network entity 105-d). In some examples, a first pseudo-noise signal associated with the first gain parameter, a second pseudo-noise signal associated with the second gain parameter, and a third pseudo-noise signal associated with the third gain parameter may each have a higher magnitude than a fourth pseudo-noise signal associated with a combination of the first pseudo-noise signal, the second pseudo-noise signal, and the third pseudo-noise signal at UE 115-b at least one network entity of one or more network entities (e.g., network entity 105-c or network entity 105-d).

In some examples, each gain parameter may be associated with a respective amplitude parameter, where a first amplitude parameter associated with a first gain parameter of the set of gain parameters is based on a second amplitude parameter associated with a second gain parameter of the set of gain parameters. In some examples, the first amplitude parameter has a same value as a second amplitude parameter, where the first amplitude parameter has different value than a third amplitude parameter associated with a third gain parameter of the set of gain parameters. In some examples, the first amplitude parameter has a same value as a fourth amplitude parameter of the set of amplitude parameters.

Figure 6:
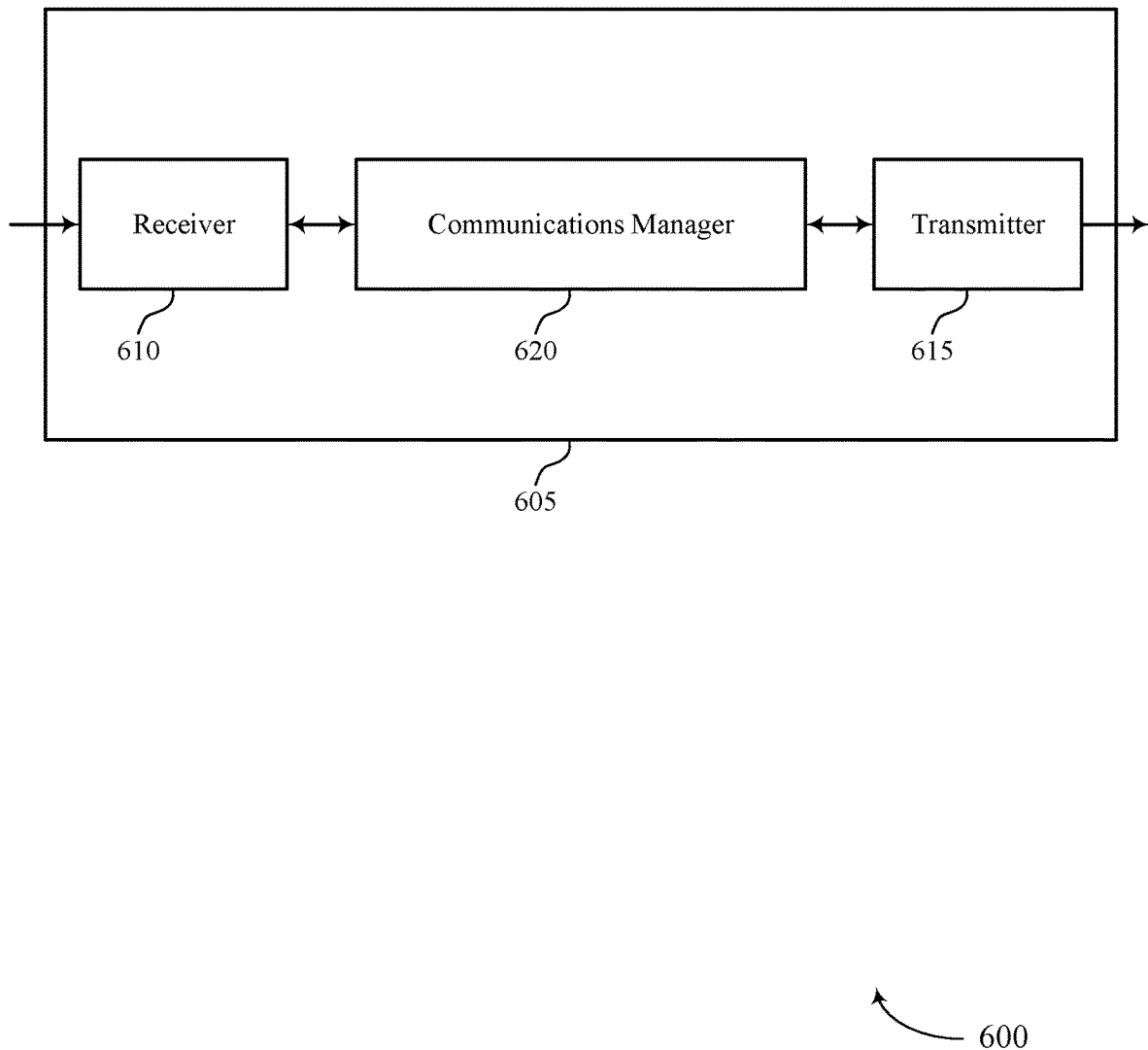
FIGS. 6 and 7 illustrate block diagrams of devices that support enhanced power control for pseudo-noise cancellation in accordance with one or more aspects of the present disclosure.

FIG. 6 illustrates a block diagram 600 of a device 605 that supports enhanced power control for pseudo-noise cancellation in accordance with one or more aspects of the present disclosure. The device 605 may be an example of aspects of a network entity 105 or a cluster of network entities 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 605. In some examples, the receiver 610 may support obtaining information by receiving signals via one or more antennas. Additionally, or alternatively, the receiver 610 may support obtaining information by receiving signals via one or more wired (e.g., electrical, fiber optic) interfaces, wireless interfaces, or any combination thereof.

The transmitter 615 may provide a means for outputting (e.g., transmitting, providing, conveying, sending) information generated by other components of the device 605. For example, the transmitter 615 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 615 may support outputting information by transmitting signals via one or more antennas. Additionally, or alternatively, the transmitter 615 may support outputting information by transmitting signals via one or more wired (e.g., electrical, fiber optic) interfaces, wireless interfaces, or any combination thereof. In some examples, the transmitter 615 and the receiver 610 may be co-located in a transceiver, which may include or be coupled with a modem.

The communications manager 620, the receiver 610, the transmitter 615, or various combinations thereof or various components thereof may be examples of means for performing various aspects of enhanced power control for pseudo-noise cancellation as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at one or more network entities in accordance with examples as disclosed herein. For example, the communications manager 620 may be configured as or otherwise support a means for obtaining, at the one or more network entities and from a UE, a set of sounding reference signals. The communications manager 620 may be configured as or otherwise support a means for estimating a set of channel state information parameters, where each channel state information parameter of the set is based on a respective sounding reference signal of the set of sounding reference signals. The communications manager 620 may be configured as or otherwise support a means for outputting, from at least one of the one or more network entities and to the UE, a set of transmissions, where each transmission of the set of transmissions including a respective pseudo-noise signal that is based on a different gain parameter of a set of gain parameters, where each gain parameter of the set of gain parameters is based on a different channel state information parameter of the set of channel state information parameters, where each gain parameter of the set of gain parameters is included in the set of gain parameters based on being less than a first threshold and greater than a second threshold.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for a greater number, on average, of reference signals of a given quantity of reference signals to be usable in determining parameters for transmitting pseudo-noise signals.

Figure 7:
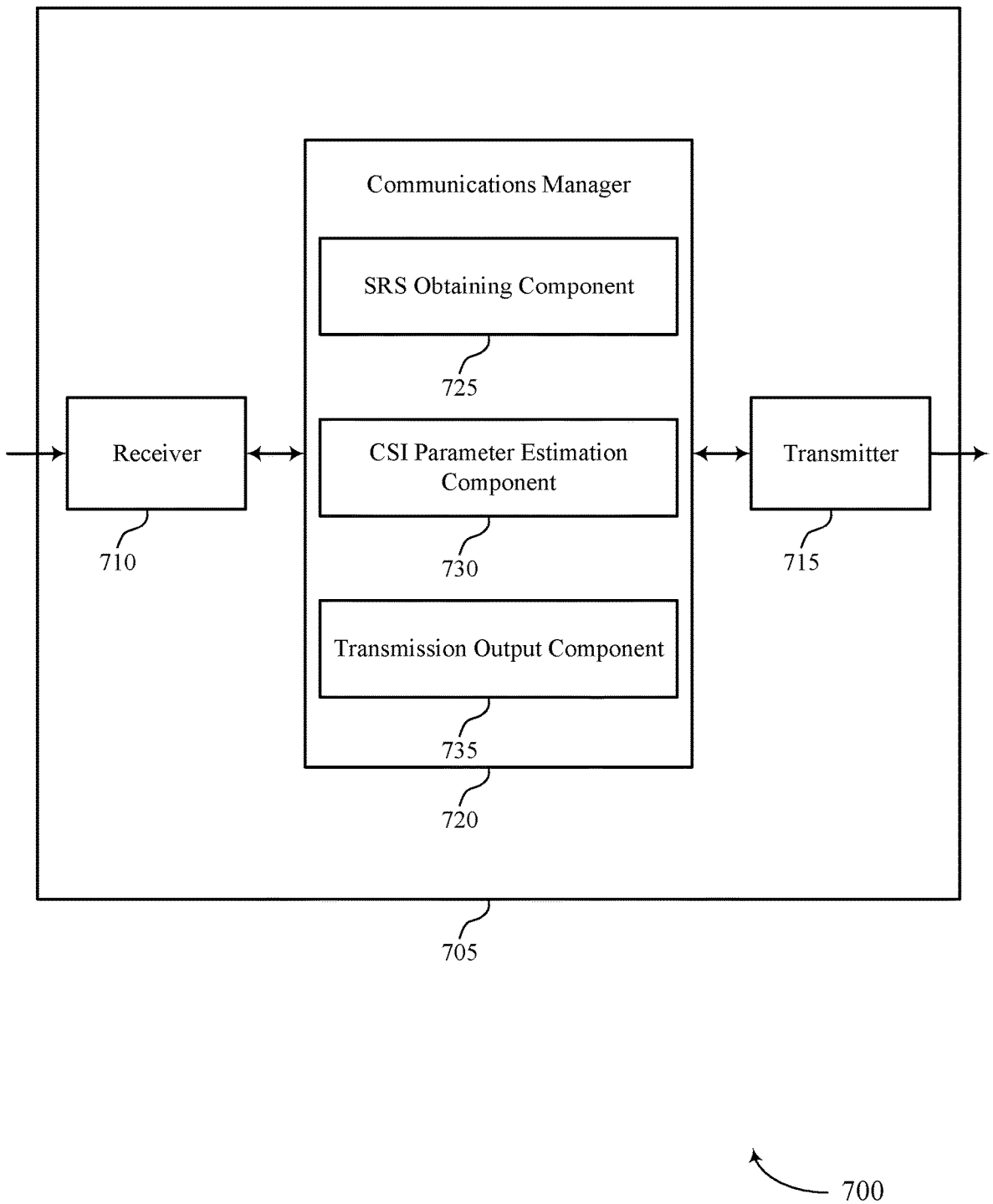

FIG. 7 illustrates a block diagram 700 of a device 705 that supports enhanced power control for pseudo-noise cancellation in accordance with one or more aspects of the present disclosure. The device 705 may be an example of aspects of a device 605, a network entity 105, or a cluster of network entities, as described herein. The device 705 may include a receiver 710, a transmitter 715, and a communications manager 720. The device 705 may also include a processor. Each of these components may be in communication with one another (e.g., via one or more buses).

The receiver 710 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 705. In some examples, the receiver 710 may support obtaining information by receiving signals via one or more antennas. Additionally, or alternatively, the receiver 710 may support obtaining information by receiving signals via one or more wired (e.g., electrical, fiber optic) interfaces, wireless interfaces, or any combination thereof.

The transmitter 715 may provide a means for outputting (e.g., transmitting, providing, conveying, sending) information generated by other components of the device 705. For example, the transmitter 715 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 715 may support outputting information by transmitting signals via one or more antennas. Additionally, or alternatively, the transmitter 715 may support outputting information by transmitting signals via one or more wired (e.g., electrical, fiber optic) interfaces, wireless interfaces, or any combination thereof. In some examples, the transmitter 715 and the receiver 710 may be co-located in a transceiver, which may include or be coupled with a modem.

The device 705, or various components thereof, may be an example of means for performing various aspects of enhanced power control for pseudo-noise cancellation as described herein. For example, the communications manager 720 may include an SRS obtaining component 725, a CSI parameter estimation component 730, a transmission output component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at one or more network entities in accordance with examples as disclosed herein. The SRS obtaining component 725 may be configured as or otherwise support a means for obtaining, at the one or more network entities and from a UE, a set of sounding reference signals. The CSI parameter estimation component 730 may be configured as or otherwise support a means for estimating a set of channel state information parameters, where each channel state information parameter of the set is based on a respective sounding reference signal of the set of sounding reference signals. The transmission output component 735 may be configured as or otherwise support a means for outputting, from at least one of the one or more network entities and to the UE, a set of transmissions, where each transmission of the set of transmissions includes a respective pseudo-noise signal that is based on a different gain parameter of a set of gain parameters, where each gain parameter of the set of gain parameters is based on a different channel state information parameter of the set of channel state information parameters, where each gain parameter of the set of gain parameters is included in the set of gain parameters based on being less than a first threshold and greater than a second threshold.

Figure 8:
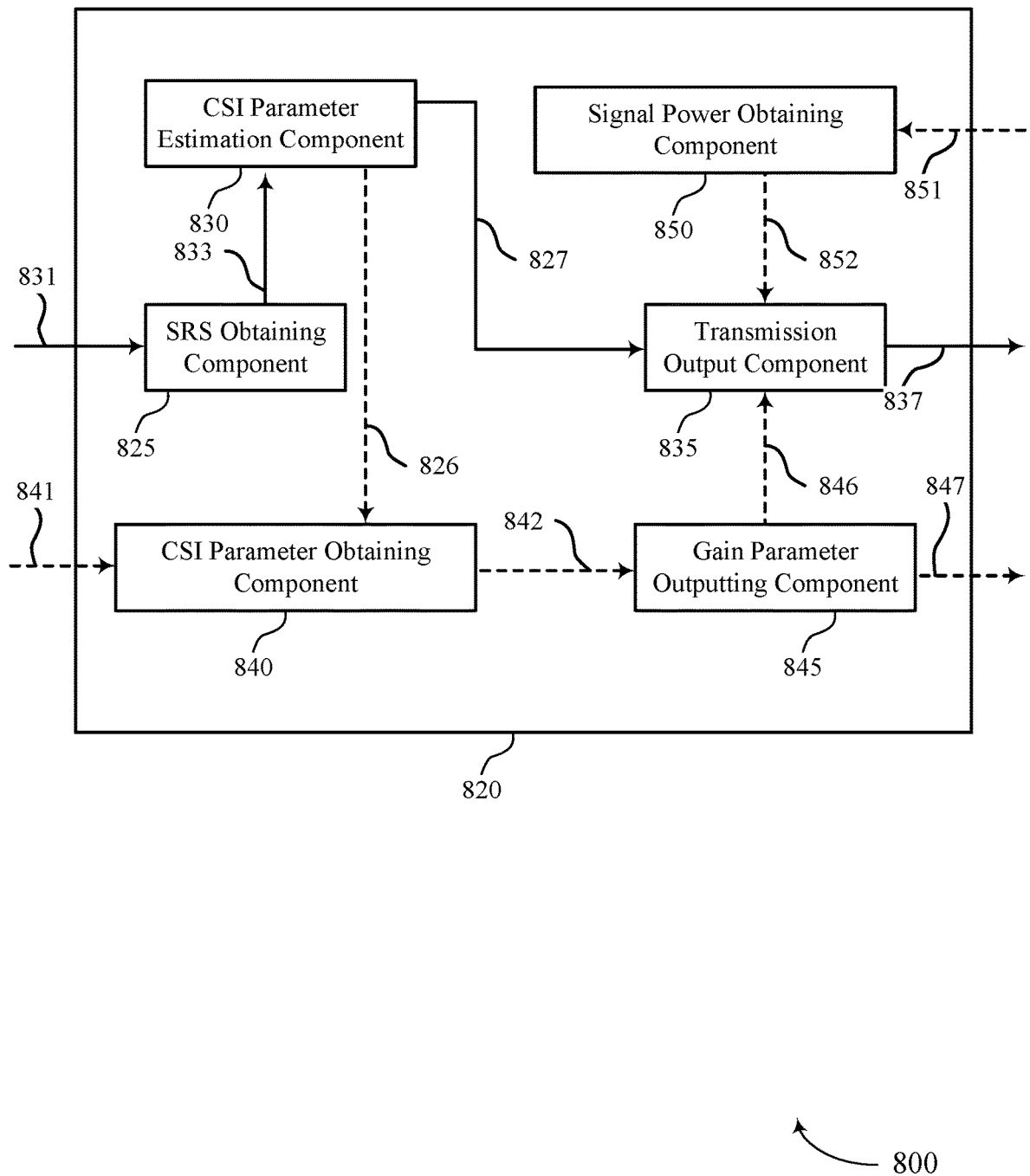
FIG. 8 illustrates a block diagram of a communications manager that supports enhanced power control for pseudo-noise cancellation in accordance with one or more aspects of the present disclosure.

FIG. 8 illustrates a block diagram 800 of a communications manager 820 that supports enhanced power control for pseudo-noise cancellation in accordance with one or more aspects of the present disclosure. The communications manager 820 may be an example of aspects of a communications manager 620, a communications manager 720, or both, as described herein. The communications manager 820, or various components thereof, may be an example of means for performing various aspects of enhanced power control for pseudo-noise cancellation as described herein. For example, the communications manager 820 may include an SRS obtaining component 825, a CSI parameter estimation component 830, a transmission output component 835, a CSI parameter obtaining component 840, a gain parameter outputting component 845, a signal power obtaining component 850, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105 or cluster of network entities 105, between devices, components, or virtualized components associated with a network entity 105), or any combination thereof.

The communications manager 820 may support wireless communication at one or more network entities in accordance with examples as disclosed herein. The SRS obtaining component 825 may be configured as or otherwise support a means for obtaining, at the one or more network entities and from a UE, a set of sounding reference signals. For instance, the SRS obtaining component 825 may obtain a set of sounding reference signals 831. In some examples, the SRS obtaining component 825 may output an indication 833 of the set of SRSs to CSI parameter estimation component 830. The CSI parameter estimation component 830 may be configured as or otherwise support a means for estimating a set of channel state information parameters, where each channel state information parameter of the set is based on a respective sounding reference signal of the set of sounding reference signals. In some examples, the CSI parameter estimation component 830 may output an indication 827 of the set of channel state information parameters to transmission output component 835. The transmission output component 835 may be configured as or otherwise support a means for outputting, from at least one of the one or more network entities and to the UE, a set of transmissions, where each transmission of the set of transmissions includes a respective pseudo-noise signal that is based on a different gain parameter of a set of gain parameters, where each gain parameter of the set of gain parameters is based on a different channel state information parameter of the set of channel state information parameters, where each gain parameter of the set of gain parameters is included in the set of gain parameters based on being less than a first threshold and greater than a second threshold. In some examples, transmission output component may transmit the set of transmissions 837.

In some examples, the one or more network entities include two or more network entities, and the CSI parameter obtaining component 840 may be configured as or otherwise support a means for obtaining, at a first network entity of the two or more network entities and from each other network entity of the two or more network entities, a respective channel state information parameter of the set of channel state information parameters, where the set of gain parameters are determined at the first network entity of the two or more network entities. In some examples, if communications manager 820 is associated with a single network entity, the CSI parameter obtaining component 840 may obtain the CSI parameter 841 from other network entities. In other examples, if communications manager 820 is associated with a cluster of network entities, the CSI parameter obtaining component 840 may obtain an indication 826 of the CSI parameter from CSI parameter estimation component 830. In some examples, the CSI parameter obtaining component 840 may output an indication 842 of the obtained CSI parameters to gain parameter outputting component 845.

In some examples, the one or more network entities include two or more network entities, and the gain parameter outputting component 845 may be configured as or otherwise support a means for outputting, from the first network entity and to respective network entities of the two or more network entities, a respective gain parameter of the set of gain parameters, where each gain parameter outputted to a respective network entity of the two or more network entities is associated with the respective channel state information parameter obtained from the respective network entity. In some examples, if communications manager 820 is associated with a single network entity, the gain parameter outputting component 845 may output the respective gain parameter outputting components 847 to other network entities. In other examples, if communications manager 820 is associated with a cluster of network entities, the gain parameter outputting component 845 may output an indication 846 of the respective gain parameters to transmission output component 835.

In some examples, the signal power obtaining component 850 may be configured as or otherwise support a means for obtaining, at the first network entity and from at least one of the two or more network entities, an indication of a maximum pseudo-noise signal power, a minimum pseudo-noise signal power, or both, where first threshold is based on obtaining the indication of the minimum pseudo-noise signal power, the second threshold is based on receiving the maximum pseudo-noise signal power, or both. In some examples, signal power obtaining component 850 may obtain an indication 851 of the maximum pseudo-noise signal power, the minimum pseudo-noise signal power, or both. In some examples, signal power obtaining component 850 may output an indication 852 of the first threshold, the second threshold, or both to transmission output component 835.

In some examples, the transmission output component 835 may be configured as or otherwise support a means for identifying a list of network entities, where the set of transmissions includes a transmission for each of the two or more network entities in the list of network entities, and where the list of network entities excludes at least one network entity of the two or more network entities based on the at least one network entity being associated with a channel strength below a threshold channel strength value or the first network entity failing to cluster the respective channel state information parameter associated with the at least one network entity with another channel state information parameter of the set of channel state information parameters.

In some examples, two or more of the set of sounding reference signals are obtained at a first network entity of the one or more network entities at different frequencies. In some examples, the first network entity outputs two or more of the set of transmissions. In some examples, at least one transmission of the two or more of the set of transmissions is outputted at a different frequency from at least one other transmission of the two or more of the set of transmissions based on obtaining the two or more of the set of sounding reference signals at different frequencies.

In some examples, two or more of the set of sounding reference signals are obtained at a first network entity of the one or more network entities over different beams. In some examples, the first network entity outputs two or more of the set of transmissions. In some examples, at least one transmission of the two or more of the set of transmissions is associated with a different beam than at least one other transmission of the two or more of the set of transmissions based on obtaining the two or more of the set of sounding reference signals over different beams.

In some examples, a first phase parameter associated with the first gain parameter is based on a second phase parameter associated with the second gain parameter.

In some examples, the first phase parameter and the second phase parameter are based on a third phase parameter associated with a third gain parameter of the set of gain parameters.

In some examples, the first phase parameter is offset from the second phase parameter and the third phase parameter by 120 degrees. In some examples, the second phase parameter is offset from the third parameter by 120 degrees.

In some examples, the first phase parameter is offset from the second phase parameter by 180 degrees.

In some examples, a first pseudo-noise signal associated with the first gain parameter and a second pseudo-noise signal associated with the second gain parameter each have a higher magnitude than a third pseudo-noise signal associated with a combination of the first pseudo-noise signal and the second pseudo-noise signal at the UE.

In some examples, a first pseudo-noise signal associated with the first gain parameter, a second noise signal associated with the second gain parameter, and a third pseudo-noise signal associated with a third gain parameter each have a higher magnitude than a fourth pseudo-noise signal associated with a combination of the first pseudo-noise signal, the second pseudo-noise, and the third pseudo-noise signal at the UE.

In some examples, each gain parameter is associated with a respective amplitude parameter. In some examples, a first amplitude parameter associated with a first gain parameter of the set of gain parameter is based on a second amplitude parameter associated with a second gain parameter of the set of gain parameters.

In some examples, the first amplitude parameter has a same value as the second amplitude parameter. In some examples, the first amplitude parameter has a different value than a third amplitude parameter associated with a third gain parameter of the set of gain parameters.

In some examples, the first amplitude parameter has a same value as a fourth amplitude parameter of the set of amplitude parameters.

Figure 9:
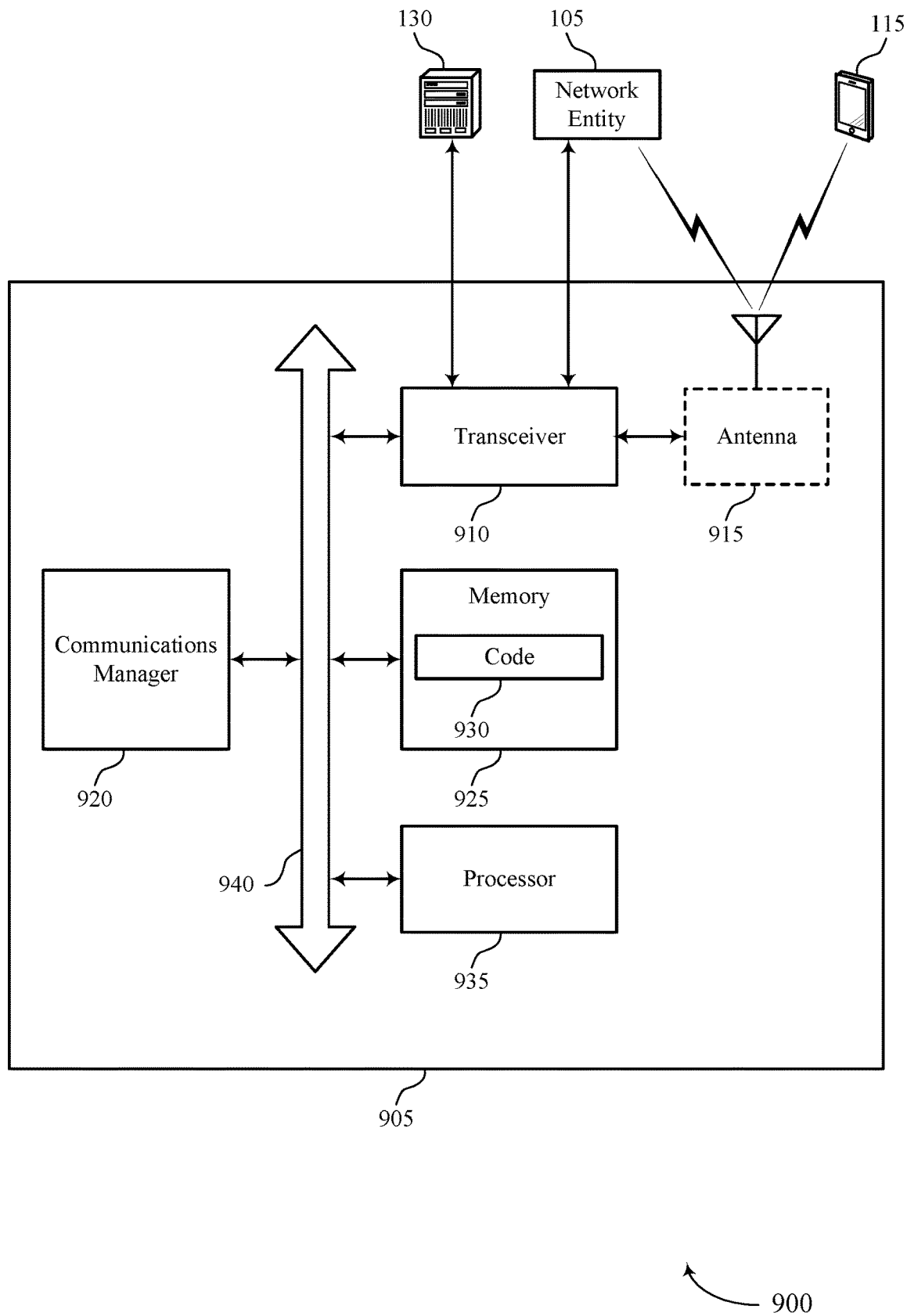
FIG. 9 illustrates a diagram of a system including a device that supports enhanced power control for pseudo-noise cancellation in accordance with one or more aspects of the present disclosure.

FIG. 9 illustrates a diagram of a system 900 including a device 905 that supports enhanced power control for pseudo-noise cancellation in accordance with one or more aspects of the present disclosure. The device 905 may be an example of or include the components of a device 605, a device 705, a network entity 105, or a cluster of network entities 105 as described herein. The device 905 may communicate with one or more network entities 105, one or more UEs 115, or any combination thereof, which may include communications over one or more wired interfaces, over one or more wireless interfaces, or any combination thereof. The device 905 may include components that support outputting and obtaining communications, such as a communications manager 920, a transceiver 910, an antenna 915, a memory 925, code 930, and a processor 935. These components may be in electronic communication or otherwise coupled (e.g., operatively, communicatively, functionally, electronically, electrically) via one or more buses (e.g., a bus 940).

The transceiver 910 may support bi-directional communications via wired links, wireless links, or both as described herein. In some examples, the transceiver 910 may include a wired transceiver and may communicate bi-directionally with another wired transceiver. Additionally, or alternatively, in some examples, the transceiver 910 may include a wireless transceiver and may communicate bi-directionally with another wireless transceiver. In some examples, the device 905 may include one or more antennas 915, which may be capable of transmitting or receiving wireless transmissions (e.g., concurrently). The transceiver 910 may also include a modem to modulate signals, to provide the modulated signals for transmission (e.g., by one or more antennas 915, by a wired transmitter), to receive modulated signals (e.g., from one or more antennas 915, from a wired receiver), and to demodulate signals. In some implementations, the transceiver 910 may include one or more interfaces, such as one or more interfaces coupled with the one or more antennas 915 that are configured to support various receiving or obtaining operations, or one or more interfaces coupled with the one or more antennas 915 that are configured to support various transmitting or outputting operations, or a combination thereof. In some implementations, the transceiver 910 may include or be configured for coupling with one or more processors or memory components that are operable to perform or support operations based on received or obtained information or signals, or to generate information or other signals for transmission or other outputting, or any combination thereof. In some implementations, the transceiver 910, or the transceiver 910 and the one or more antennas 915, or the transceiver 910 and the one or more antennas 915 and one or more processors or memory components (for example, the processor 935, or the memory 925, or both), may be included in a chip or chip assembly that is installed in the device 905. In some examples, the transceiver may be operable to support communications via one or more communications links (e.g., a communication link 125, a backhaul communication link 120, a midhaul communication link 162, a fronthaul communication link 168).

The memory 925 may include RAM and ROM. The memory 925 may store computer-readable, computer-executable code 930 including instructions that, when executed by the processor 935, cause the device 905 to perform various functions described herein. The code 930 may be stored in a non-transitory computer-readable medium such as system memory or another type of memory. In some cases, the code 930 may not be directly executable by the processor 935 but may cause a computer (e.g., when compiled and executed) to perform functions described herein. In some cases, the memory 925 may contain, among other things, a BIOS which may control basic hardware or software operation such as the interaction with peripheral components or devices.

The processor 935 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 935 may be configured to operate a memory array using a memory controller. In some other cases, a memory controller may be integrated into the processor 935. The processor 935 may be configured to execute computer-readable instructions stored in a memory (e.g., the memory 925) to cause the device 905 to perform various functions (e.g., functions or tasks supporting enhanced power control for pseudo-noise cancellation). For example, the device 905 or a component of the device 905 may include a processor 935 and memory 925 coupled with the processor 935, the processor 935 and memory 925 configured to perform various functions described herein. The processor 935 may be an example of a cloud-computing platform (e.g., one or more physical nodes and supporting software such as operating systems, virtual machines, or container instances) that may host the functions (e.g., by executing code 930) to perform the functions of the device 905. The processor 935 may be any one or more suitable processors capable of executing scripts or instructions of one or more software programs stored in the device 905 (such as within the memory 925). In some implementations, the processor 935 may be a component of a processing system. A processing system may generally refer to a system or series of machines or components that receives inputs and processes the inputs to produce a set of outputs (which may be passed to other systems or components of, for example, the device 905). For example, a processing system of the device 905 may refer to a system including the various other components or subcomponents of the device 905, such as the processor 935, or the transceiver 910, or the communications manager 920, or other components or combinations of components of the device 905. The processing system of the device 905 may interface with other components of the device 905, and may process information received from other components (such as inputs or signals) or output information to other components. For example, a chip or modem of the device 905 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 905 may transmit information output from the chip or modem. Additionally, or alternatively, in some implementations, the one or more interfaces may refer to an interface between the processing system of the chip or modem and a receiver, such that the device 905 may obtain information or signal inputs, and the information may be passed to the processing system. A person having ordinary skill in the art will readily recognize that a first interface also may obtain information or signal inputs, and a second interface also may output information or signal outputs.

In some examples, a bus 940 may support communications of (e.g., within) a protocol layer of a protocol stack. In some examples, a bus 940 may support communications associated with a logical channel of a protocol stack (e.g., between protocol layers of a protocol stack), which may include communications performed within a component of the device 905, or between different components of the device 905 that may be co-located or located in different locations (e.g., where the device 905 may refer to a system in which one or more of the communications manager 920, the transceiver 910, the memory 925, the code 930, and the processor 935 may be located in one of the different components or divided between different components).

In some examples, the communications manager 920 may manage aspects of communications with a core network 130 (e.g., via one or more wired or wireless backhaul links). For example, the communications manager 920 may manage the transfer of data communications for client devices, such as one or more UEs 115. In some examples, the communications manager 920 may manage communications with other network entities 105, and may include a controller or scheduler for controlling communications with UEs 115 in cooperation with other network entities 105. In some examples, the communications manager 920 may support an X2 interface within an LTE/LTE-A wireless communications network technology to provide communication between network entities 105.

The communications manager 920 may support wireless communication at one or more network entities in accordance with examples as disclosed herein. For example, the communications manager 920 may be configured as or otherwise support a means for obtaining, at the one or more network entities and from a UE, a set of sounding reference signals. The communications manager 920 may be configured as or otherwise support a means for estimating a set of channel state information parameters, where each channel state information parameter of the set is based on a respective sounding reference signal of the set of sounding reference signals. The communications manager 920 may be configured as or otherwise support a means for outputting, from at least one of the one or more network entities and to the UE, a set of transmissions, where each transmission of the set of transmissions including a respective pseudo-noise signal that is based on a different gain parameter of a set of gain parameters, where each gain parameter of the set of gain parameters is based on a different channel state information parameter of the set of channel state information parameters, where each gain parameter of the set of gain parameters is included in the set of gain parameters based on being less than a first threshold and greater than a second threshold.

By including or configuring the communications manager 920 in accordance with examples as described herein, the device 905 may support techniques for a greater number, on average, of reference signals of a given quantity of reference signals to be usable in determining parameters for transmitting pseudo-noise signals.

In some examples, the communications manager 920 may be configured to perform various operations (e.g., receiving, obtaining, monitoring, outputting, transmitting) using or otherwise in cooperation with the transceiver 910, the one or more antennas 915 (e.g., where applicable), or any combination thereof. Although the communications manager 920 is illustrated as a separate component, in some examples, one or more functions described with reference to the communications manager 920 may be supported by or performed by the transceiver 910, the processor 935, the memory 925, the code 930, or any combination thereof. For example, the code 930 may include instructions executable by the processor 935 to cause the device 905 to perform various aspects of enhanced power control for pseudo-noise cancellation as described herein, or the processor 935 and the memory 925 may be otherwise configured to perform or support such operations.

Figure 10:
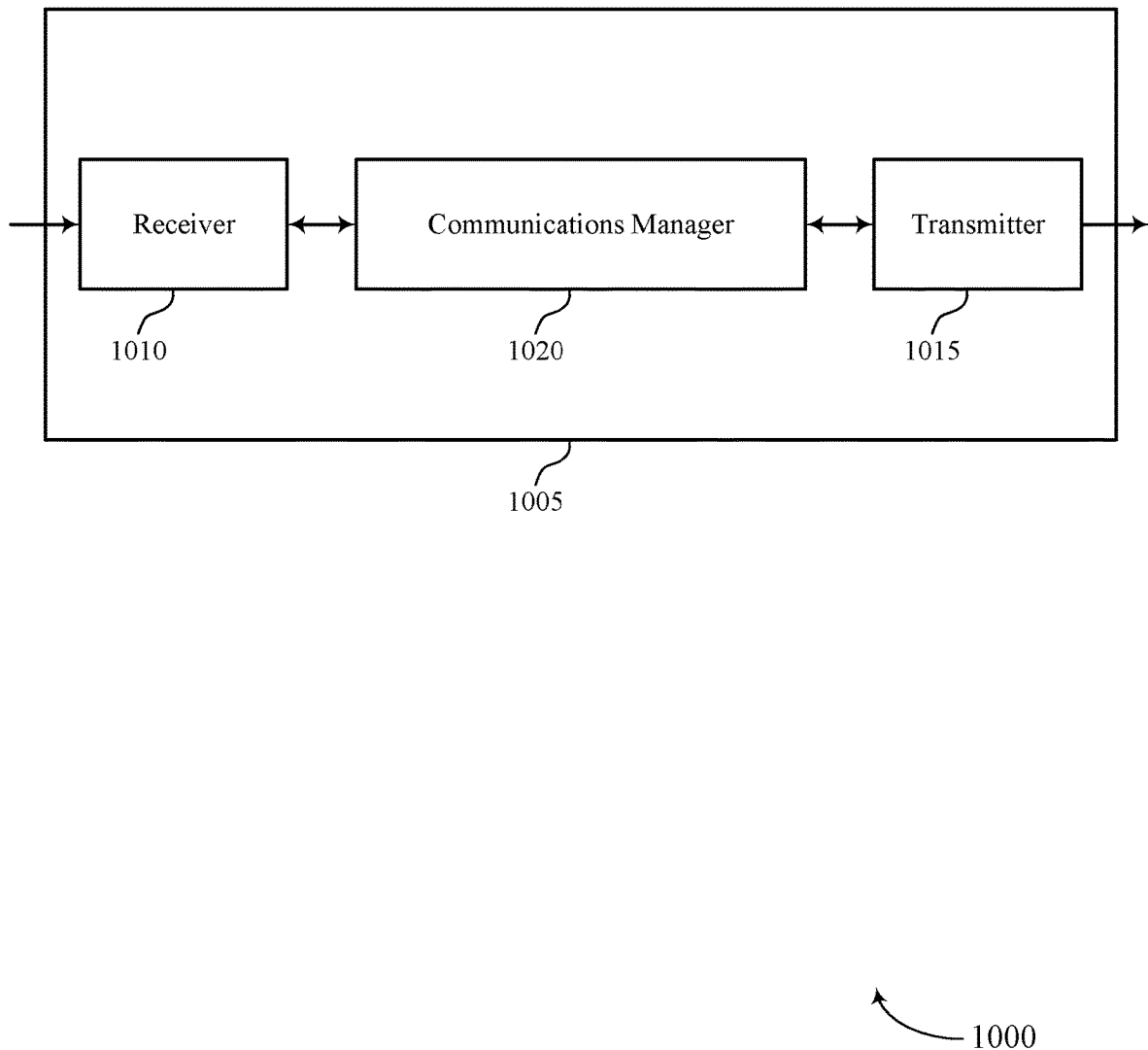
FIGS. 10 and 11 illustrate block diagrams of devices that support enhanced power control for pseudo-noise cancellation in accordance with one or more aspects of the present disclosure.

FIG. 10 illustrates a block diagram 1000 of a device 1005 that supports enhanced power control for pseudo-noise cancellation in accordance with one or more aspects of the present disclosure. The device 1005 may be an example of aspects of a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to enhanced power control for pseudo-noise cancellation). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to enhanced power control for pseudo-noise cancellation). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of enhanced power control for pseudo-noise cancellation as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a UE in accordance with examples as disclosed herein. For example, the communications manager 1020 may be configured as or otherwise support a means for receiving, by the UE and from one or more network entities, a set of channel state information reference signals. The communications manager 1020 may be configured as or otherwise support a means for estimating a set of channel state information parameters, where each channel state information parameter of the set is based on a respective channel state information reference signal of the set of channel state information reference signals. The communications manager 1020 may be configured as or otherwise support a means for transmitting, by the UE and to at least one of the one or more network entities, a set of transmissions, where each transmission of the set of transmissions includes a respective pseudo-noise signal that is based on a different gain parameter of a set of gain parameters, where each gain parameter of the set of gain parameters is based on a different channel state information parameter of the set of channel state information parameters, and where each gain parameter of the set of gain parameters is included in the set of gain parameters based on being less than a first threshold and greater than a second threshold.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for a greater number, on average, of reference signals of a given quantity of reference signals to be usable in determining parameters for transmitting pseudo-noise signals.

Figure 11:
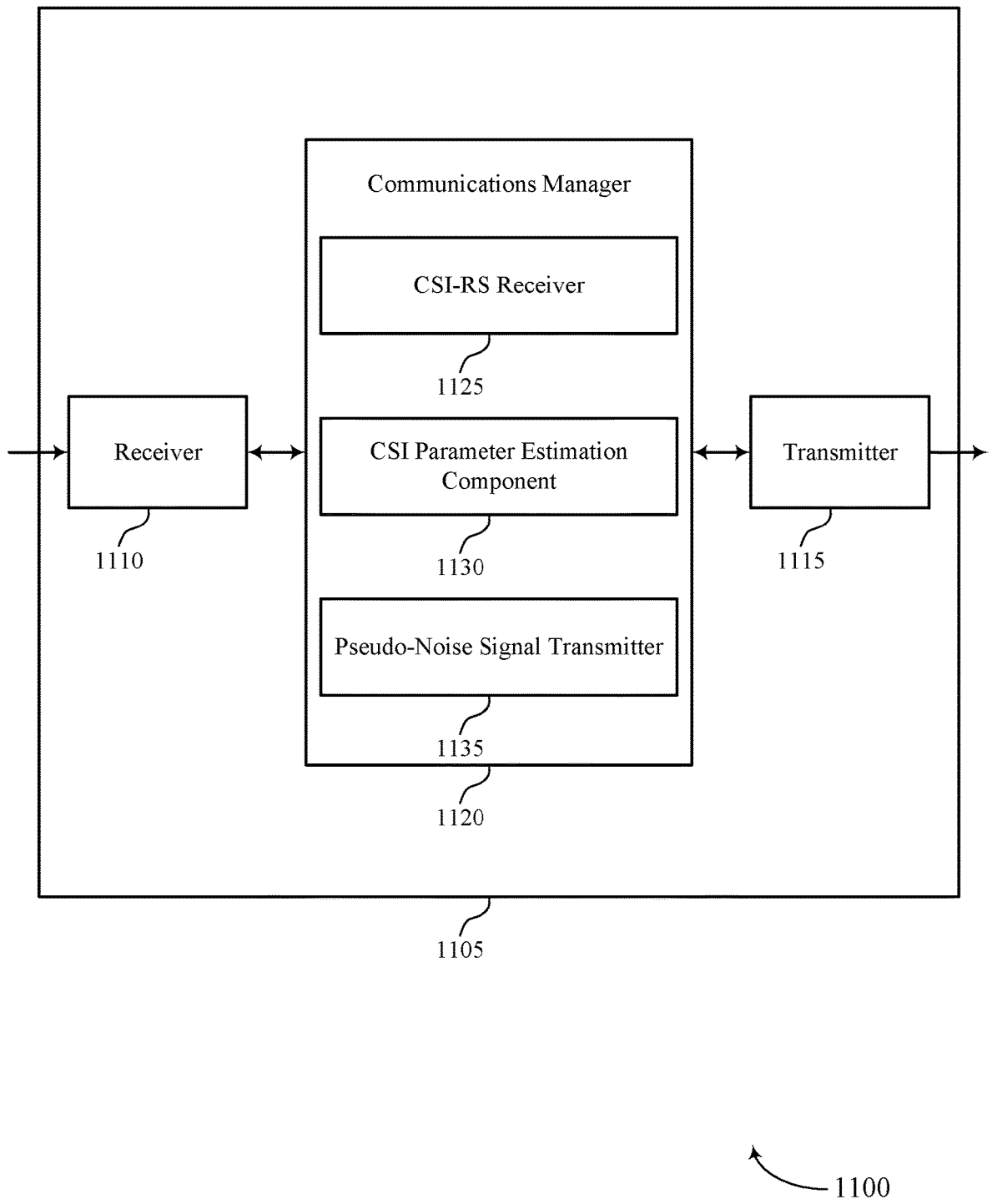

FIG. 11 illustrates a block diagram 1100 of a device 1105 that supports enhanced power control for pseudo-noise cancellation in accordance with one or more aspects of the present disclosure. The device 1105 may be an example of aspects of a device 1005 or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to enhanced power control for pseudo-noise cancellation). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to enhanced power control for pseudo-noise cancellation). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of enhanced power control for pseudo-noise cancellation as described herein. For example, the communications manager 1120 may include a CSI-RS receiver 1125, a CSI parameter estimation component 1130, a pseudo-noise signal transmitter 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a UE in accordance with examples as disclosed herein. The CSI-RS receiver 1125 may be configured as or otherwise support a means for receiving, by the UE and from one or more network entities, a set of channel state information reference signals. The CSI parameter estimation component 1130 may be configured as or otherwise support a means for estimating a set of channel state information parameters, where each channel state information parameter of the set is based on a respective channel state information reference signal of the set of channel state information reference signals. The pseudo-noise signal transmitter 1135 may be configured as or otherwise support a means for transmitting, by the UE and to at least one of the one or more network entities, a set of transmissions, where each transmission of the set of transmissions includes a respective pseudo-noise signal that is based on a different gain parameter of a set of gain parameters, where each gain parameter of the set of gain parameters is based on a different channel state information parameter of the set of channel state information parameters, and where each gain parameter of the set of gain parameters is included in the set of gain parameters based on being less than a first threshold and greater than a second threshold.

Figure 12:
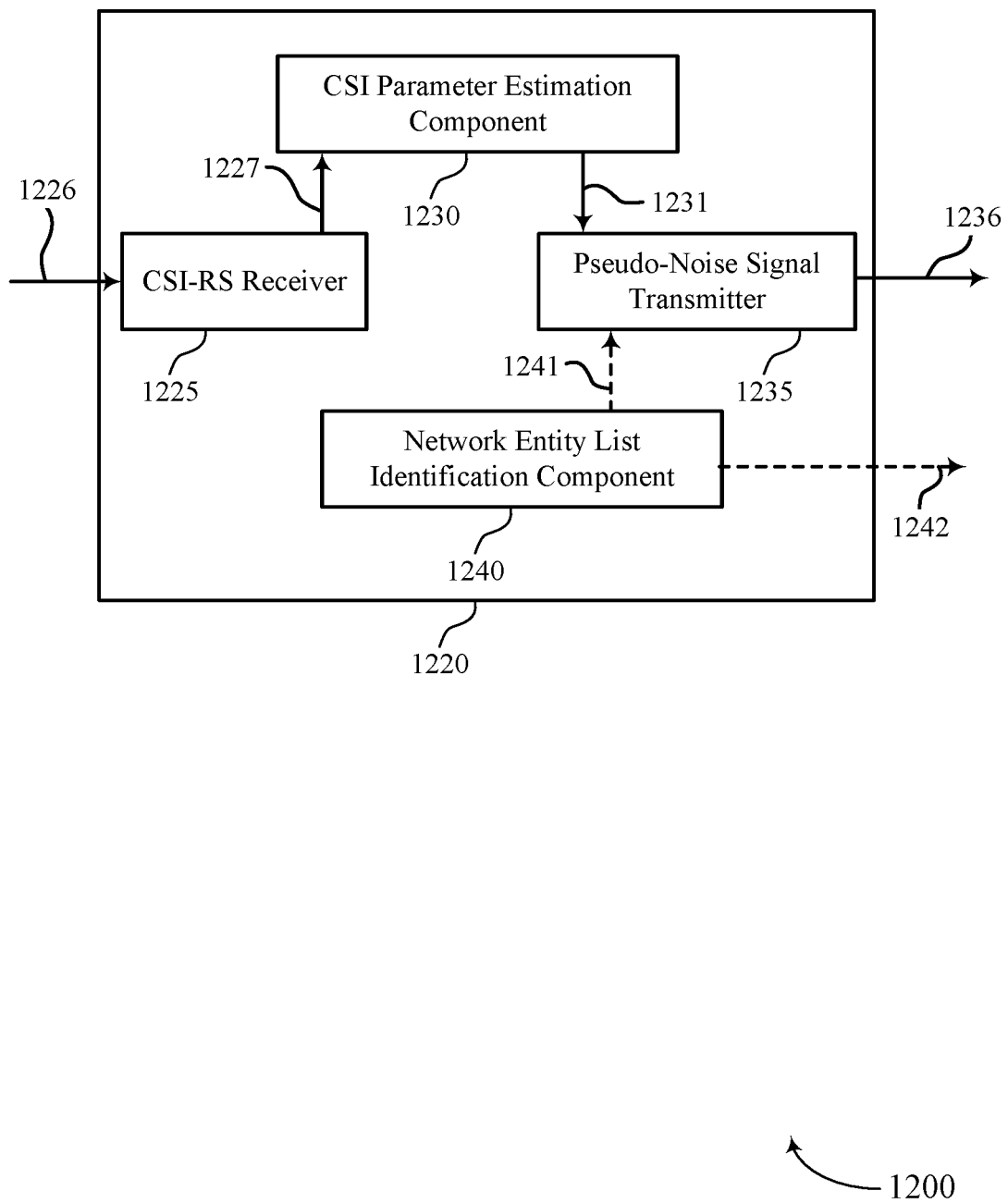
FIG. 12 illustrates a block diagram of a communications manager that supports enhanced power control for pseudo-noise cancellation in accordance with one or more aspects of the present disclosure.

FIG. 12 illustrates a block diagram 1200 of a communications manager 1220 that supports enhanced power control for pseudo-noise cancellation in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of enhanced power control for pseudo-noise cancellation as described herein. For example, the communications manager 1220 may include a CSI-RS receiver 1225, a CSI parameter estimation component 1230, a pseudo-noise signal transmitter 1235, a network entity list identification component 1240, or any combination thereof. Each of these components may communicate, directly or indirectly, with one another (e.g., via one or more buses).

The communications manager 1220 may support wireless communication at a UE in accordance with examples as disclosed herein. The CSI-RS receiver 1225 may be configured as or otherwise support a means for receiving, by the UE and from one or more network entities, a set of channel state information reference signals. In some examples, the CSI-RS receiver 1225 may receive the set of channel state information reference signals 1226. In some examples, the CSI-RS receiver 1225 may provide an indication 1227 of the set of channel state information reference signals to CSI parameter estimation component 1230. The CSI parameter estimation component 1230 may be configured as or otherwise support a means for estimating a set of channel state information parameters, where each channel state information parameter of the set is based on a respective channel state information reference signal of the set of channel state information reference signals. In some examples, the CSI parameter estimation component 1230 may provide an indication 1231 of the set of channel state information parameters to pseudo-noise signal transmitter 1235. The pseudo-noise signal transmitter 1235 may be configured as or otherwise support a means for transmitting, by the UE and to at least one of the one or more network entities, a set of transmissions, where each transmission of the set of transmissions includes a respective pseudo-noise signal that is based on a different gain parameter of a set of gain parameters, where each gain parameter of the set of gain parameters is based on a different channel state information parameter of the set of channel state information parameters, and where each gain parameter of the set of gain parameters is included in the set of gain parameters based on being less than a first threshold and greater than a second threshold. In some examples, the pseudo-noise signal transmitter 1235 may transmit the set of transmissions 1236.

In some examples, the one or more network entities include two or more network entities. In some examples, at least one of the set of channel state information reference signals is received from a different network entity of the two or more network entities than another one of the set of channel state information reference signals.

In some examples, two or more of the set of channel state information reference signals are received from a first network entity of the one or more network entities at different frequencies. In some examples, at least one transmission of two or more of the set of transmissions is output at a different frequency from at least one other transmission of the two or more of the set of transmissions based on receiving the two or more of the set of channel state information reference signals at different frequencies.

In some examples, two or more of the set of channel state information reference signals are received from a first network entity of the one or more network entities over different beams. In some examples, at least one transmission of two or more of the set of transmissions is associated with a different beam than at least one other transmission of the two or more of the set of transmissions based on receiving the two or more of the set of channel state information reference signals over different beams.

In some examples, the network entity list identification component 1240 may be configured as or otherwise support a means for identifying a list of network entities, where the set of transmissions includes a transmission for each network entity in the list of network entities, where the list of network entities excludes at least one network entity of the one or more network entities. In some examples, the pseudo-noise signal transmitter 1235 may be configured as or otherwise support a means for transmitting, to the at least one of the one or more network entities, an indication of the list of network entities. In some examples, the network entity list identification component 1240 may transmit an indication 1241 of the list of network entities to pseudo-noise signal transmitter 1235. In some examples, the network entity list identification component 1240 may transmit an indication 1242 of the list of network entities (e.g., to a network entity).

In some examples, a first phase parameter associated with the first gain parameter is based on a second phase parameter associated with the second gain parameter.

In some examples, the first phase parameter and the second phase parameter are based on a third phase parameter associated with a third gain parameter of the set of gain parameters.

In some examples, the first phase parameter is offset from the second phase parameter and the third phase parameter by 120 degrees. In some examples, the second phase parameter is offset from the third parameter by 120 degrees.

In some examples, the first phase parameter is offset from the second phase parameter by 180 degrees.

In some examples, a first pseudo-noise signal associated with the first gain parameter and a second pseudo-noise signal associated with the second gain parameter each have a higher magnitude than a third pseudo-noise signal associated with a combination of the first pseudo-noise signal and the second pseudo-noise signal at the at least one network entity of the one or more network entities.

In some examples, a first pseudo-noise signal associated with the first gain parameter, a second noise signal associated with the second gain parameter, and a third pseudo-noise signal associated with a third gain parameter each have a higher magnitude than a fourth pseudo-noise signal associated with a combination of the first pseudo-noise signal, the second pseudo-noise, and the third pseudo-noise signal at the at least one network entity of the one or more network entities.

In some examples, each gain parameter is associated with a respective amplitude parameter. In some examples, a first amplitude parameter associated with a first gain parameter of the set of gain parameter is based on a second amplitude parameter associated with a second gain parameter of the set of gain parameters.

Figure 13:
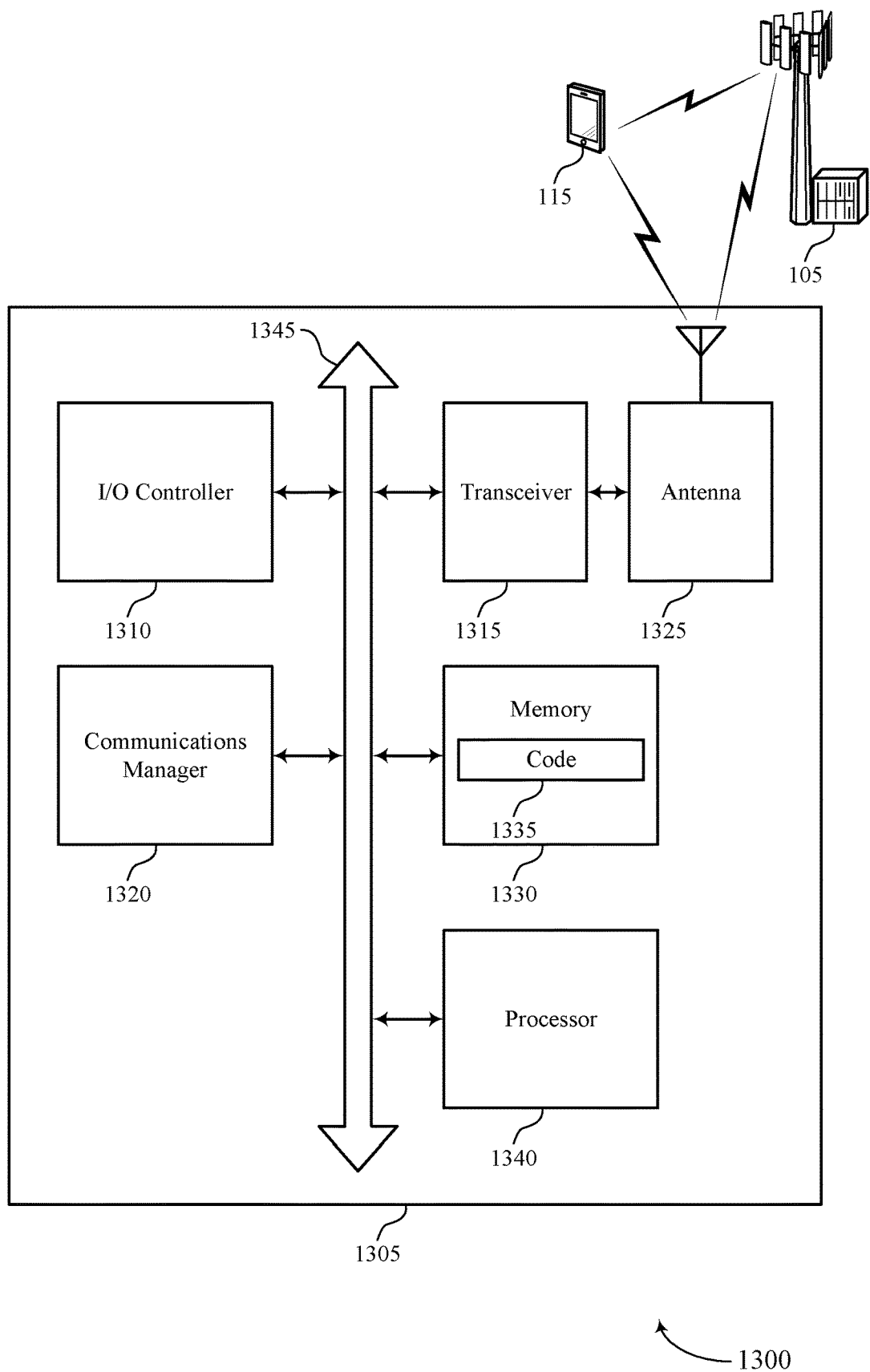
FIG. 13 illustrates a diagram of a system including a device that supports enhanced power control for pseudo-noise cancellation in accordance with one or more aspects of the present disclosure.

FIG. 13 illustrates a diagram of a system 1300 including a device 1305 that supports enhanced power control for pseudo-noise cancellation in accordance with one or more aspects of the present disclosure. The device 1305 may be an example of or include the components of a device 1005, a device 1105, or a UE 115 as described herein. The device 1305 may communicate (e.g., wirelessly) with one or more network entities 105, one or more UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally, or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include random access memory (RAM) and read-only memory (ROM). The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a basic I/O system (BIOS) which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting enhanced power control for pseudo-noise cancellation). For example, the device 1305 or a component of the device 1305 may include a processor 1340 and memory 1330 coupled with or to the processor 1340, the processor 1340 and memory 1330 configured to perform various functions described herein.

The communications manager 1320 may support wireless communication at a UE in accordance with examples as disclosed herein. For example, the communications manager 1320 may be configured as or otherwise support a means for receiving, by the UE and from one or more network entities, a set of channel state information reference signals. The communications manager 1320 may be configured as or otherwise support a means for estimating a set of channel state information parameters, where each channel state information parameter of the set is based on a respective channel state information reference signal of the set of channel state information reference signals. The communications manager 1320 may be configured as or otherwise support a means for transmitting, by the UE and to at least one of the one or more network entities, a set of transmissions, where each transmission of the set of transmissions includes a respective pseudo-noise signal that is based on a different gain parameter of a set of gain parameters, where each gain parameter of the set of gain parameters is based on a different channel state information parameter of the set of channel state information parameters, and where each gain parameter of the set of gain parameters is included in the set of gain parameters based on being less than a first threshold and greater than a second threshold.

By including or configuring the communications manager 1320 in accordance with examples as described herein, the device 1305 may support techniques for a greater number, on average, of reference signals of a given quantity of reference signals to be usable in determining parameters for transmitting pseudo-noise signals.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of enhanced power control for pseudo-noise cancellation as described herein, or the processor 1340 and the memory 1330 may be otherwise configured to perform or support such operations.

Figure 14:
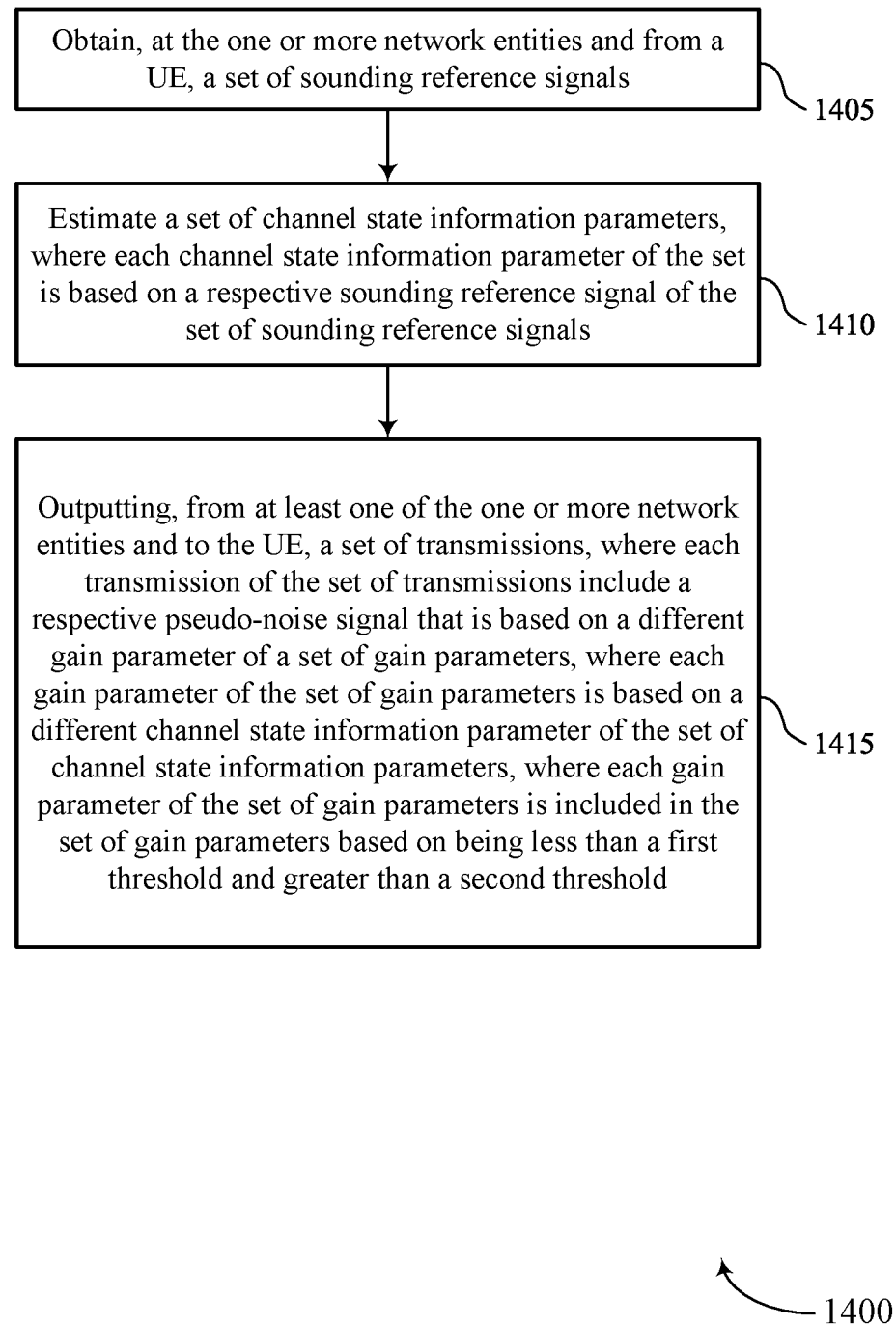
FIGS. 14 through 17 illustrate flowcharts showing methods that support enhanced power control for pseudo-noise cancellation in accordance with one or more aspects of the present disclosure.

FIG. 14 illustrates a flowchart illustrating a method 1400 that supports enhanced power control for pseudo-noise cancellation in accordance with one or more aspects of the present disclosure. The operations of the method 1400 may be implemented by a network entity, a cluster of network entities, or their components as described herein. For example, the operations of the method 1400 may be performed by a network entity as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1405, the method may include obtaining, at the one or more network entities and from a UE, a set of sounding reference signals. The operations of 1405 may be performed in accordance with examples as disclosed herein. In some examples, aspects of the operations of 1405 may be performed by an SRS obtaining component 825 as described with reference to FIG. 8. Obtaining the sounding reference signals may include identifying time-frequency resources over which the sounding reference signals are transmitted and obtaining the sounding reference signals over those identified time-frequency resources.

At 1410, the method may include estimating a set of channel state information parameters, where each channel state information parameter of the set is based on a respective sounding reference signal of the set of sounding reference signals. The operations of 1410 may be performed in accordance with examples as disclosed herein. In some examples, aspects of the operations of 1410 may be performed by a CSI parameter estimation component 830 as described with reference to FIG. 8. Estimating the set of channel state information parameters may include determining a channel strength or quality for some or each of the set of sounding reference signals.

At 1415, the method may include outputting, from at least one of the one or more network entities and to the UE, a set of transmissions, where each transmission of the set of transmissions includes a respective pseudo-noise signal that is based on a different gain parameter of a set of gain parameters, where each gain parameter of the set of gain parameters is based on a different channel state information parameter of the set of channel state information parameters, where each gain parameter of the set of gain parameters is included in the set of gain parameters based on being less than a first threshold and greater than a second threshold. The operations of 1415 may be performed in accordance with examples as disclosed herein. In some examples, aspects of the operations of 1415 may be performed by a transmission output component 835 as described with reference to FIG. 8. Outputting the set of transmissions may include identifying time-frequency resources over which each of the set of transmissions are transmitted and outputting the set of transmissions over those identified time-frequency resources.

Figure 15:
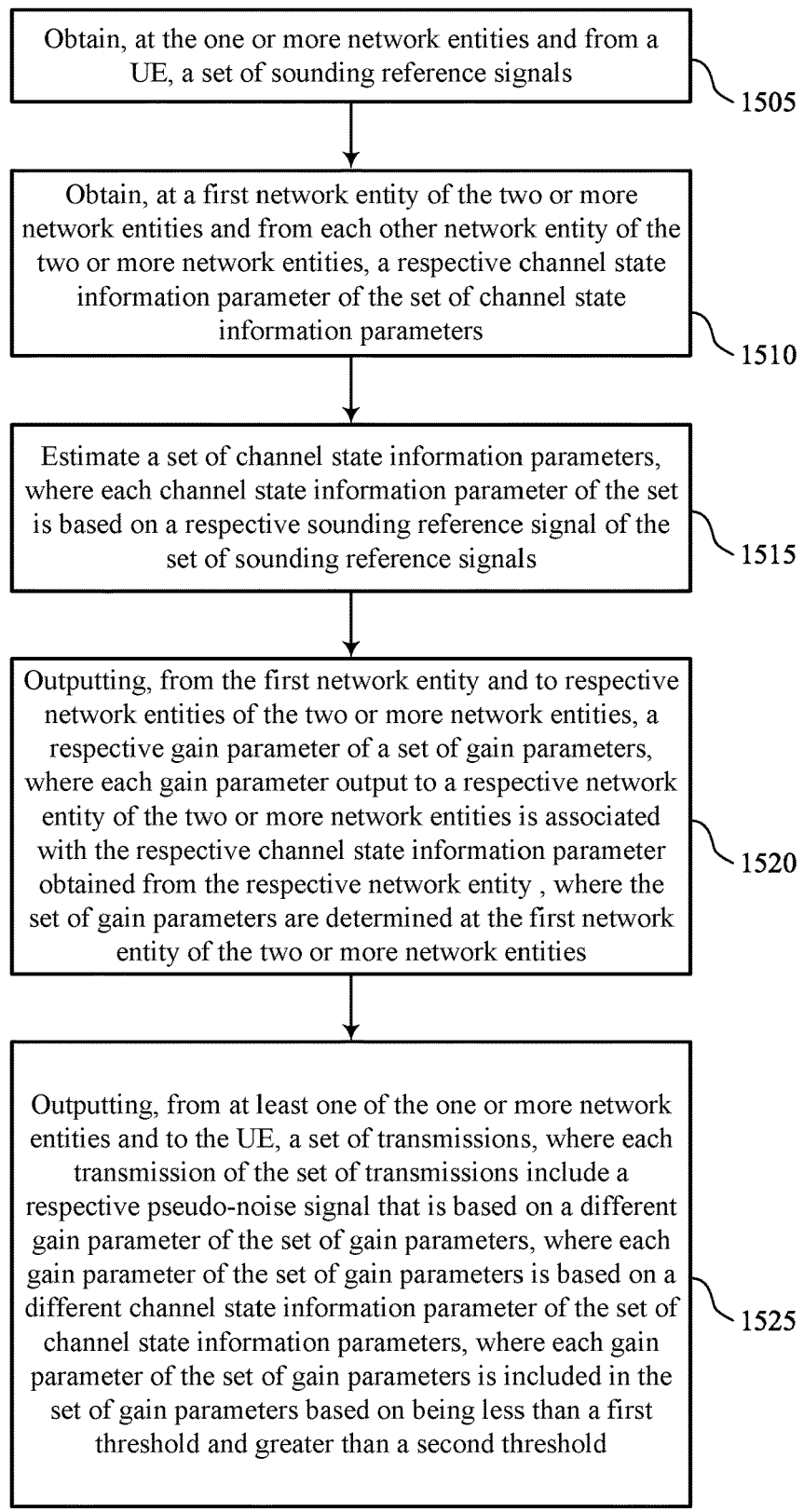

FIG. 15 illustrates a flowchart illustrating a method 1500 that supports enhanced power control for pseudo-noise cancellation in accordance with one or more aspects of the present disclosure. The operations of the method 1500 may be implemented by a network entity, a cluster of network entities, or their components as described herein. For example, the operations of the method 1500 may be performed by a network entity as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1505, the method may include obtaining, at the one or more network entities and from a UE, a set of sounding reference signals. The operations of 1505 may be performed in accordance with examples as disclosed herein. In some examples, aspects of the operations of 1505 may be performed by an SRS obtaining component 825 as described with reference to FIG. 8. Obtaining the sounding reference signals may include identifying time-frequency resources over which the sounding reference signals are transmitted and obtaining the sounding reference signals over those identified time-frequency resources.

At 1510, the method may include obtaining, at a first network entity of the two or more network entities and from each other network entity of the two or more network entities, a respective channel state information parameter of the set of channel state information parameters. The operations of 1510 may be performed in accordance with examples as disclosed herein. In some examples, aspects of the operations of 1510 may be performed by a CSI parameter obtaining component 840 as described with reference to FIG. 8. Obtaining the respective channel state information parameters may include identifying time-frequency resources over which the respective channel estate information parameters are transmitted and obtaining the respective channel state information parameters over those identified time-frequency resources.

At 1515, the method may include estimating a set of channel state information parameters, where each channel state information parameter of the set is based on a respective sounding reference signal of the set of sounding reference signals. The operations of 1515 may be performed in accordance with examples as disclosed herein. In some examples, aspects of the operations of 1515 may be performed by a CSI parameter estimation component 830 as described with reference to FIG. 8. Estimating the set of channel state information parameters may include determining a channel strength or quality for some or each of the set of sounding reference signals.

At 1520, the method may include outputting, from the first network entity and to respective network entities of the two or more network entities, a respective gain parameter of a set of gain parameters, where each gain parameter output to a respective network entity of the two or more network entities is associated with the respective channel state information parameter obtained from the respective network entity, where the set of gain parameters are determined at the first network entity of the two or more network entities. The operations of 1520 may be performed in accordance with examples as disclosed herein. In some examples, aspects of the operations of 1520 may be performed by a gain parameter outputting component 845 as described with reference to FIG. 8. Outputting the respective gain parameters may include identifying time-frequency resources over which each of the gain parameters are output and outputting the respective gain parameters over those identified time-frequency resources.

At 1525, the method may include outputting, from at least one of the one or more network entities and to the UE, a set of transmissions, where each transmission of the set of transmissions include a respective pseudo-noise signal that is based on a different gain parameter of the set of gain parameters, where each gain parameter of the set of gain parameters is based on a different channel state information parameter of the set of channel state information parameters, where each gain parameter of the set of gain parameters is included in the set of gain parameters based on being less than a first threshold and greater than a second threshold. The operations of 1525 may be performed in accordance with examples as disclosed herein. In some examples, aspects of the operations of 1525 may be performed by a transmission output component 835 as described with reference to FIG. 8. Outputting the set of transmissions may include identifying time-frequency resources over which each of the set of transmissions are transmitted and outputting the set of transmissions over those identified time-frequency resources.

Figure 16:
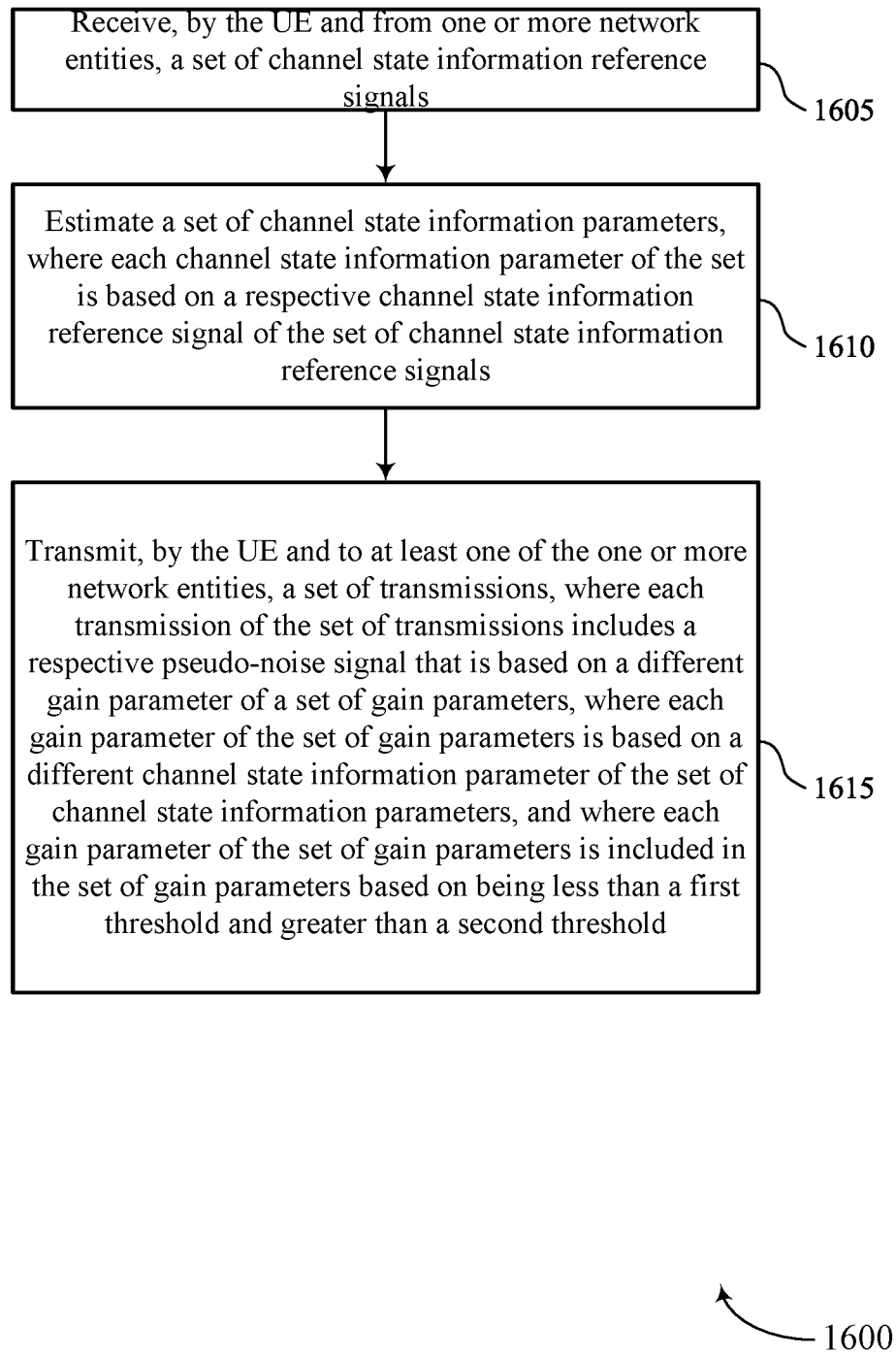

FIG. 16 illustrates a flowchart illustrating a method 1600 that supports enhanced power control for pseudo-noise cancellation in accordance with one or more aspects of the present disclosure. The operations of the method 1600 may be implemented by a UE or its components as described herein. For example, the operations of the method 1600 may be performed by a UE 115 as described with reference to FIGS. 1 through 5 and 10 through 13. In some examples, a UE may execute a set of instructions to control the functional elements of the UE to perform the described functions. Additionally, or alternatively, the UE may perform aspects of the described functions using special-purpose hardware.

At 1605, the method may include receiving, by the UE and from one or more network entities, a set of channel state information reference signals. The operations of 1605 may be performed in accordance with examples as disclosed herein. In some examples, aspects of the operations of 1605 may be performed by a CSI-RS receiver 1225 as described with reference to FIG. 12. Receiving the channel state information reference signals may include identifying time-frequency resources over which the channel state information reference signals are transmitted and receiving the channel state information reference signals over those identified time-frequency resources.

At 1610, the method may include estimating a set of channel state information parameters, where each channel state information parameter of the set is based on a respective channel state information reference signal of the set of channel state information reference signals. The operations of 1610 may be performed in accordance with examples as disclosed herein. In some examples, aspects of the operations of 1610 may be performed by a CSI parameter estimation component 1230 as described with reference to FIG. 12. Estimating the set of channel state information parameters may include determining a channel strength or quality for some or each of the set of channel state information reference signals.

At 1615, the method may include transmitting, by the UE and to at least one of the one or more network entities, a set of transmissions, where each transmission of the set of transmissions includes a respective pseudo-noise signal that is based on a different gain parameter of a set of gain parameters, where each gain parameter of the set of gain parameters is based on a different channel state information parameter of the set of channel state information parameters, and where each gain parameter of the set of gain parameters is included in the set of gain parameters based on being less than a first threshold and greater than a second threshold. The operations of 1615 may be performed in accordance with examples as disclosed herein. In some examples, aspects of the operations of 1615 may be performed by a pseudo-noise signal transmitter 1235 as described with reference to FIG. 12. Transmitting the set of transmissions may include identifying time-frequency resources over which each of the set of transmissions are transmitted and transmitting the set of transmissions over those identified time-frequency resources.

Figure 17:
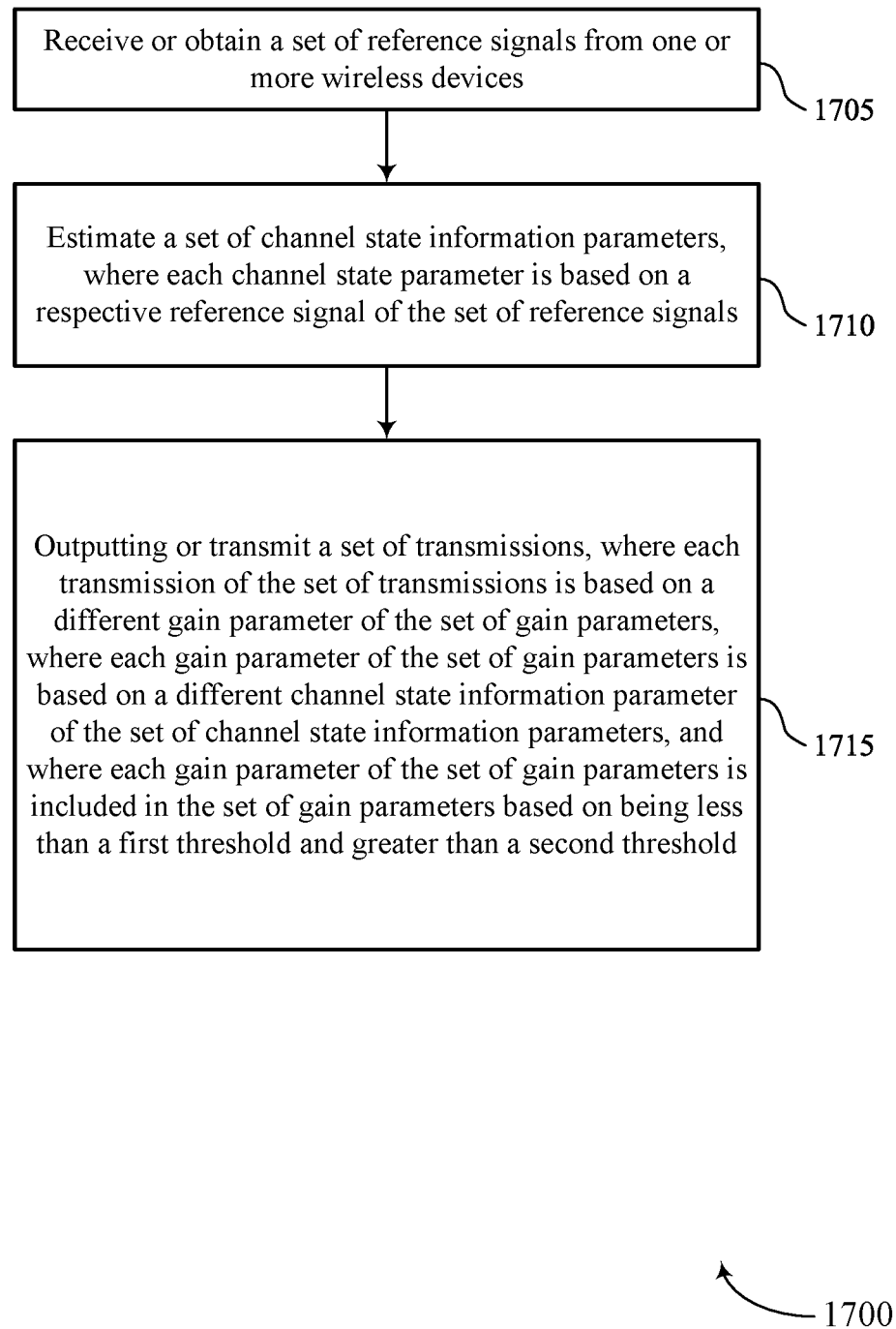

FIG. 17 illustrates a flowchart illustrating a method 1700 that supports enhanced power control for pseudo-noise cancellation in accordance with one or more aspects of the present disclosure. The operations of the method 1700 may be implemented by a network entity, a cluster of network entities, a UE, or their components as described herein. For example, the operations of the method 1700 may be performed by a network entity or a UE as described with reference to FIGS. 1 through 13. In some examples, a network entity may execute a set of instructions to control the functional elements of the network entity to perform the described functions. Additionally, or alternatively, the network entity may perform aspects of the described functions using special-purpose hardware.

At 1705, the method may include receiving or obtaining a set of reference signals from one or more wireless devices. The operations of 1705 may be performed in accordance with examples as disclosed herein. In some examples, aspects of the operations of 1705 may be performed by an SRS obtaining component 825 as described with reference to FIG. 8 or a CSI-RS receiver 1225 as described with reference to FIG. 12. Obtaining or receiving the set of reference signals may include identifying time-frequency resources over which the sounding reference signals are transmitted and obtaining or receiving the sounding reference signals over those identified time-frequency resources At 1710, the method may include estimating a set of channel state information parameters, where each channel state parameter is based on a respective reference signal of the set of reference signals. The operations of 1710 may be performed in accordance with examples as disclosed herein. In some examples, aspects of the operations of 1710 may be performed by a CSI parameter estimation component 830 as described with reference to FIG. 8 or a CSI parameter estimation component 1230 as described with reference to FIG. 12. Estimating the set of channel state information parameters may include determining a channel strength or quality for some or each of the set of reference signals.

At 1715, the method may include outputting or transmitting a set of transmissions, where each transmission of the set of transmissions is based on a different gain parameter of the set of gain parameters, where each gain parameter of the set of gain parameters is based on a different channel state information parameter of the set of channel state information parameters, and where each gain parameter of the set of gain parameters is included in the set of gain parameters based on being less than a first threshold and greater than a second threshold. The operations of 1715 may be performed in accordance with examples as disclosed herein. In some examples, aspects of the operations of 1715 may be performed by a transmission output component 835 as described with reference to FIG. 8 or a pseudo-noise signal transmitter 1235 as described with reference to FIG. 12. Outputting or transmitting the set of transmissions may include identifying time-frequency resources over which each of the set of transmissions are transmitted or output and outputting or transmitting the set of transmissions over those identified time-frequency resources.

The following provides an overview of aspects of the present disclosure:

Aspect 1: A method for wireless communication at one or more network entities, comprising: obtaining, at the one or more network entities and from a UE, a set of sounding reference signals; estimating a set of channel state information parameters, wherein each channel state information parameter of the set is based at least in part on a respective sounding reference signal of the set of sounding reference signals; and outputting, from at least one of the one or more network entities and to the UE, a set of transmissions, wherein each transmission of the set of transmissions comprises a respective pseudo-noise signal that is based at least in part on a different gain parameter of a set of gain parameters, wherein each gain parameter of the set of gain parameters is based at least in part on a different channel state information parameter of the set of channel state information parameters, wherein each gain parameter of the set of gain parameters is included in the set of gain parameters based at least in part on being less than a first threshold and greater than a second threshold.

Aspect 2: The method of aspect 1, wherein the one or more network entities comprise two or more network entities, the method further comprising: obtaining, at a first network entity of the two or more network entities and from each other network entity of the two or more network entities, a respective channel state information parameter of the set of channel state information parameters, wherein the set of gain parameters are determined at the first network entity of the two or more network entities; and outputting, from the first network entity and to respective network entities of the two or more network entities, a respective gain parameter of the set of gain parameters, wherein each gain parameter outputted to a respective network entity of the two or more network entities is associated with the respective channel state information parameter obtained from the respective network entity.

Aspect 3: The method of aspect 2, wherein the one or more network entities comprise two or more network entities, the method further comprising: obtaining, at the first network entity and from at least one of the two or more network entities, an indication of a maximum pseudo-noise signal power, a minimum pseudo-noise signal power, or both, wherein first threshold is based at least in part on obtaining the indication of the minimum pseudo-noise signal power, the second threshold is based at least in part on receiving the maximum pseudo-noise signal power, or both.

Aspect 4: The method of any of aspects 2 through 3, further comprising: identifying a list of network entities, wherein the set of transmissions comprises a transmission for each of the two or more network entities in the list of network entities, and wherein the list of network entities excludes at least one network entity of the two or more network entities based at least in part on the at least one network entity being associated with a channel strength below a threshold channel strength value or the first network entity failing to cluster the respective channel state information parameter associated with the at least one network entity with another channel state information parameter of the set of channel state information parameters.

Aspect 5: The method of any of aspects 1 through 4, wherein two or more of the set of sounding reference signals are obtained at a first network entity of the one or more network entities at different frequencies, the first network entity outputs two or more of the set of transmissions, at least one transmission of the two or more of the set of transmissions is outputted at a different frequency from at least one other transmission of the two or more of the set of transmissions based at least in part on obtaining the two or more of the set of sounding reference signals at different frequencies.

Aspect 6: The method of any of aspects 1 through 5, wherein two or more of the set of sounding reference signals are obtained at a first network entity of the one or more network entities over different beams, the first network entity outputs two or more of the set of transmissions, at least one transmission of the two or more of the set of transmissions is associated with a different beam than at least one other transmission of the two or more of the set of transmissions based at least in part on obtaining the two or more of the set of sounding reference signals over different beams.

Aspect 7: The method of any of aspects 1 through 6, wherein a first phase parameter associated with the first gain parameter is based at least in part on a second phase parameter associated with the second gain parameter.

Aspect 8: The method of aspect 7, wherein the first phase parameter and the second phase parameter are based at least in part on a third phase parameter associated with a third gain parameter of the set of gain parameters.

Aspect 9: The method of aspect 8, wherein the first phase parameter is offset from the second phase parameter and the third phase parameter by 120 degrees, and the second phase parameter is offset from the third parameter by 120 degrees.

Aspect 10: The method of any of aspects 7 through 9, wherein the first phase parameter is offset from the second phase parameter by 180 degrees.

Aspect 11: The method of any of aspects 1 through 10, wherein a first pseudo-noise signal associated with the first gain parameter and a second pseudo-noise signal associated with the second gain parameter each have a higher magnitude than a third pseudo-noise signal associated with a combination of the first pseudo-noise signal and the second pseudo-noise signal at the UE.

Aspect 12: The method of any of aspects 1 through 11, wherein a first pseudo-noise signal associated with the first gain parameter, a second noise signal associated with the second gain parameter, and a third pseudo-noise signal associated with a third gain parameter each have a higher magnitude than a fourth pseudo-noise signal associated with a combination of the first pseudo-noise signal, the second pseudo-noise, and the third pseudo-noise signal at the UE.

Aspect 13: The method of any of aspects 1 through 12, wherein each gain parameter is associated with a respective amplitude parameter, and a first amplitude parameter associated with a first gain parameter of the set of gain parameter is based at least in part on a second amplitude parameter associated with a second gain parameter of the set of gain parameters.

Aspect 14: The method of aspect 13, wherein the first amplitude parameter has a same value as the second amplitude parameter, and the first amplitude parameter has a different value than a third amplitude parameter associated with a third gain parameter of the set of gain parameters.

Aspect 15: The method of aspect 14, wherein the first amplitude parameter has a same value as a fourth amplitude parameter of the set of amplitude parameters.

Aspect 16: A method for wireless communication at a UE, comprising: receiving, by the UE and from one or more network entities, a set of channel state information reference signals; estimating a set of channel state information parameters, wherein each channel state information parameter of the set is based at least in part on a respective channel state information reference signal of the set of channel state information reference signals; and transmitting, by the UE and to at least one of the one or more network entities, a set of transmissions, wherein each transmission of the set of transmissions comprises a respective pseudo-noise signal that is based at least in part on a different gain parameter of a set of gain parameters, wherein each gain parameter of the set of gain parameters is based at least in part on a different channel state information parameter of the set of channel state information parameters, and wherein each gain parameter of the set of gain parameters is included in the set of gain parameters based at least in part on being less than a first threshold and greater than a second threshold.

Aspect 17: The method of aspect 16, wherein the one or more network entities comprise two or more network entities, and at least one of the set of channel state information reference signals is received from a different network entity of the two or more network entities than another one of the set of channel state information reference signals.

Aspect 18: The method of any of aspects 16 through 17, wherein two or more of the set of channel state information reference signals are received from a first network entity of the one or more network entities at different frequencies, at least one transmission of two or more of the set of transmissions is output at a different frequency from at least one other transmission of the two or more of the set of transmissions based at least in part on receiving the two or more of the set of channel state information reference signals at different frequencies.

Aspect 19: The method of any of aspects 16 through 18, wherein two or more of the set of channel state information reference signals are received from a first network entity of the one or more network entities over different beams, at least one transmission of two or more of the set of transmissions is associated with a different beam than at least one other transmission of the two or more of the set of transmissions based at least in part on receiving the two or more of the set of channel state information reference signals over different beams.

Aspect 20: The method of any of aspects 16 through 19, further comprising: identifying a list of network entities, wherein the set of transmissions comprises a transmission for each network entity in the list of network entities, wherein the list of network entities excludes at least one network entity of the one or more network entities; and transmitting, to the at least one of the one or more network entities, an indication of the list of network entities.

Aspect 21: The method of any of aspects 16 through 20, wherein a first phase parameter associated with the first gain parameter is based at least in part on a second phase parameter associated with the second gain parameter.

Aspect 22: The method of aspect 21, wherein the first phase parameter and the second phase parameter are based at least in part on a third phase parameter associated with a third gain parameter of the set of gain parameters.

Aspect 23: The method of aspect 22, wherein the first phase parameter is offset from the second phase parameter and the third phase parameter by 120 degrees, and the second phase parameter is offset from the third parameter by 120 degrees.

Aspect 24: The method of any of aspects 21 through 23, wherein the first phase parameter is offset from the second phase parameter by 180 degrees.

Aspect 25: The method of any of aspects 16 through 24, wherein a first pseudo-noise signal associated with the first gain parameter and a second pseudo-noise signal associated with the second gain parameter each have a higher magnitude than a third pseudo-noise signal associated with a combination of the first pseudo-noise signal and the second pseudo-noise signal at the at least one network entity of the one or more network entities.

Aspect 26: The method of any of aspects 16 through 25, wherein a first pseudo-noise signal associated with the first gain parameter, a second noise signal associated with the second gain parameter, and a third pseudo-noise signal associated with a third gain parameter each have a higher magnitude than a fourth pseudo-noise signal associated with a combination of the first pseudo-noise signal, the second pseudo-noise, and the third pseudo-noise signal at the at least one network entity of the one or more network entities.

Aspect 27: The method of any of aspects 16 through 26, wherein each gain parameter is associated with a respective amplitude parameter, and a first amplitude parameter associated with a first gain parameter of the set of gain parameter is based at least in part on a second amplitude parameter associated with a second gain parameter of the set of gain parameters.

Aspect 28: The method of any of aspects 16 through 27, wherein the first amplitude parameter has a same value as the second amplitude parameter, and the first amplitude parameter has a different value than a third amplitude parameter associated with a third gain parameter of the set of gain parameters.

Aspect 29: An apparatus for wireless communication at one or more network entities, comprising a processor; memory coupled with the processor; and instructions stored in the memory and executable by the processor to cause the apparatus to perform a method of any of aspects 1 through 15.

Aspect 30: An apparatus for wireless communication at one or more network entities, comprising at least one means for performing a method of any of aspects 1 through 15.

Aspect 31: A non-transitory computer-readable medium storing code for wireless communication at one or more network entities, the code comprising instructions executable by a processor to perform a method of any of aspects 1 through 15.

Aspect 32: An apparatus for wireless communication at a UE, comprising a processor; memory coupled with the processor; and instructions stored in the memory and executable by the processor to cause the apparatus to perform a method of any of aspects 16 through 28.

Aspect 33: An apparatus for wireless communication at a UE, comprising at least one means for performing a method of any of aspects 16 through 28.

Aspect 34: A non-transitory computer-readable medium storing code for wireless communication at a UE, the code comprising instructions executable by a processor to perform a method of any of aspects 16 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at one or more network entities, comprising:
    a processor;
    memory coupled with the processor; and
    instructions stored in the memory and executable by the processor to cause the apparatus to:
        obtain, at the one or more network entities and from a user equipment (UE), a set of sounding reference signals;
        estimate a set of channel state information parameters, wherein
            each channel state information parameter of the set is based at least in part on a respective sounding reference signal of the set of sounding reference signals; and
        outputting, from at least one of the one or more network entities and to the UE, a set of transmissions, wherein each transmission of the set of transmissions comprise a respective pseudo-noise signal that is based at least in part on a different gain parameter of a set of gain parameters, wherein each gain parameter of the set of gain parameters is based at least in part on a different channel state information parameter of the set of channel state information parameters, wherein each gain parameter of the set of gain parameters is included in the set of gain parameters based at least in part on being less than a first threshold and greater than a second threshold.

2. The apparatus of claim 1, wherein the one or more network entities comprise two or more network entities, and the instructions are further executable by the processor to cause the apparatus to:
    obtain, at a first network entity of the two or more network entities and from each other network entity of the two or more network entities, a respective channel state information parameter of the set of channel state information parameters, wherein the set of gain parameters are determined at the first network entity of the two or more network entities; and
    outputting, from the first network entity and to respective network entities of the two or more network entities, a respective gain parameter of the set of gain parameters, wherein each gain parameter output to a respective network entity of the two or more network entities is associated with the respective channel state information parameter obtained from the respective network entity.

3. The apparatus of claim 2, wherein the instructions are further executable by the processor to cause the apparatus to:
    obtain, at the first network entity and from at least one of the two or more network entities, an indication of a maximum pseudo-noise signal power, a minimum pseudo-noise signal power, or both, wherein first threshold is based at least in part on obtaining the indication of the minimum pseudo-noise signal power, the second threshold is based at least in part on receiving the maximum pseudo-noise signal power, or both.

4. The apparatus of claim 2, wherein the instructions are further executable by the processor to cause the apparatus to:
    identify a list of network entities, wherein the set of transmissions comprises a transmission for each of the two or more network entities in the list of network entities, and wherein the list of network entities excludes at least one network entity of the two or more network entities based at least in part on the at least one network entity being associated with a channel strength below a threshold channel strength value or the first network entity failing to cluster the respective channel state information parameter associated with the at least one network entity with another channel state information parameter of the set of channel state information parameters.

5. The apparatus of claim 1, wherein:
    two or more of the set of sounding reference signals are obtained at a first network entity of the one or more network entities at different frequencies,
    the first network entity outputs two or more of the set of transmissions, and at least one transmission of the two or more of the set of transmissions is outputted at a different frequency from at least one other transmission of the two or more of the set of transmissions based at least in part on obtaining the two or more of the set of sounding reference signals at different frequencies.

6. The apparatus of claim 1, wherein:
two or more of the set of sounding reference signals are obtained at a first network entity of the one or more network entities over different beams,
the first network entity outputs two or more of the set of transmissions, and
at least one transmission of the two or more of the set of transmissions is associated with a different beam than at least one other transmission of the two or more of the set of transmissions based at least in part on obtaining the two or more of the set of sounding reference signals over different beams.

7. The apparatus of claim 1, wherein a first phase parameter associated with a first gain parameter of the set of gain parameters is based at least in part on a second phase parameter associated with a second gain parameter of the set of gain parameters.

8. The apparatus of claim 7, wherein the first phase parameter and the second phase parameter are based at least in part on a third phase parameter associated with a third gain parameter of the set of gain parameters.

9. The apparatus of claim 8, wherein:
the first phase parameter is offset from the second phase parameter and the third phase parameter by 120 degrees, and
the second phase parameter is offset from the third phase parameter by 120 degrees.

10. The apparatus of claim 7, wherein the first phase parameter is offset from the second phase parameter by 180 degrees.

11. The apparatus of claim 1, wherein a first pseudo-noise signal associated with a first gain parameter of the set of gain parameters and a second pseudo-noise signal associated with a second gain parameter of the set of gain parameters each have a higher magnitude than a third pseudo-noise signal associated with a combination of the first pseudo-noise signal and the second pseudo-noise signal at the UE.

12. The apparatus of claim 1, wherein a first pseudo-noise signal associated with a first gain parameter of the set of gain parameters, a second pseudo-noise signal associated with a second gain parameter of the set of gain parameters, and a third pseudo-noise signal associated with a third gain parameter of the set of gain parameters each have a higher magnitude than a fourth pseudo-noise signal associated with a combination of the first pseudo-noise signal, the second pseudo-noise signal, and the third pseudo-noise signal at the UE.

13. The apparatus of claim 1, wherein:
each gain parameter is associated with a respective amplitude parameter, and
a first amplitude parameter associated with a first gain parameter of the set of gain parameters is based at least in part on a second amplitude parameter associated with a second gain parameter of the set of gain parameters.

14. The apparatus of claim 13, wherein:
the first amplitude parameter has a same value as the second amplitude parameter, and
the first amplitude parameter has a different value than a third amplitude parameter associated with a third gain parameter of the set of gain parameters.

15. The apparatus of claim 14, wherein the first amplitude parameter has a same value as a fourth amplitude parameter associated with a fourth gain parameter of the set of gain parameters.

16. An apparatus for wireless communication at a user equipment (UE), comprising:
a processor;
memory coupled with the processor; and
instructions stored in the memory and executable by the processor to cause the apparatus to:
receive, by the UE and from one or more network entities, a set of channel state information reference signals;
estimate a set of channel state information parameters, wherein each channel state information parameter of the set is based at least in part on a respective channel state information reference signal of the set of channel state information reference signals; and
transmit, by the UE and to at least one of the one or more network entities, a set of transmissions, wherein each transmission of the set of transmissions comprises a respective pseudo-noise signal that is based at least in part on a different gain parameter of a set of gain parameters, wherein each gain parameter of the set of gain parameters is based at least in part on a different channel state information parameter of the set of channel state information parameters, and wherein each gain parameter of the set of gain parameters is included in the set of gain parameters based at least in part on being less than a first threshold and greater than a second threshold.

17. The apparatus of claim 16, wherein:
the one or more network entities comprise two or more network entities, and
at least one of the set of channel state information reference signals is received from a different network entity of the two or more network entities than another one of the set of channel state information reference signals.

18. The apparatus of claim 16, wherein:
two or more of the set of channel state information reference signals are received from a first network entity of the one or more network entities at different frequencies, and
at least one transmission of two or more of the set of transmissions is output at a different frequency from at least one other transmission of the two or more of the set of transmissions based at least in part on receiving the two or more of the set of channel state information reference signals at different frequencies.

19. The apparatus of claim 16, wherein:
two or more of the set of channel state information reference signals are received from a first network entity of the one or more network entities over different beams, and
at least one transmission of two or more of the set of transmissions is associated with a different beam than at least one other transmission of the two or more of the set of transmissions based at least in part on receiving the two or more of the set of channel state information reference signals over different beams.

20. The apparatus of claim 16, wherein the instructions are further executable by the processor to cause the apparatus to:
identify a list of network entities, wherein the set of transmissions comprises a transmission for each network entity in the list of network entities, wherein the list of network entities excludes at least one network entity of the one or more network entities; and transmit, to the at least one of the one or more network entities, an indication of the list of network entities.

21. The apparatus of claim 16, wherein a first phase parameter associated with a first gain parameter of the set of gain parameters is based at least in part on a second phase parameter associated with a second gain parameter of the set of gain parameters.

22. The apparatus of claim 21, wherein the first phase parameter and the second phase parameter are based at least in part on a third phase parameter associated with a third gain parameter of the set of gain parameters.

23. The apparatus of claim 22, wherein:
the first phase parameter is offset from the second phase parameter and the third phase parameter by 120 degrees, and
the second phase parameter is offset from the third phase parameter by 120 degrees.

24. The apparatus of claim 21, wherein the first phase parameter is offset from the second phase parameter by 180 degrees.

25. The apparatus of claim 16, wherein a first pseudo-noise signal associated with a first gain parameter of the set of gain parameters and a second pseudo-noise signal associated with a second gain parameter of the set of gain parameters each have a higher magnitude than a third pseudo-noise signal associated with a combination of the first pseudo-noise signal and the second pseudo-noise signal at the at least one network entity of the one or more network entities.

26. The apparatus of claim 16, wherein a first pseudo-noise signal associated with a first gain parameter of the set of gain parameters, a second pseudo-noise signal associated with a second gain parameter of the set of gain parameters, and a third pseudo-noise signal associated with a third gain parameter of the set of gain parameters each have a higher magnitude than a fourth pseudo-noise signal associated with a combination of the first pseudo-noise signal, the second pseudo-noise signal, and the third pseudo-noise signal at the at least one network entity of the one or more network entities.

27. The apparatus of claim 16, wherein:
each gain parameter is associated with a respective amplitude parameter, and
a first amplitude parameter associated with a first gain parameter of the set of gain parameters is based at least in part on a second amplitude parameter associated with a second gain parameter of the set of gain parameters.

28. The apparatus of claim 27, wherein the first amplitude parameter has a same value as the second amplitude parameter, and wherein the first amplitude parameter has a different value than a third amplitude parameter associated with a third gain parameter of the set of gain parameters.

29. A method for wireless communication at one or more network entities, comprising:
obtaining, at the one or more network entities and from a user equipment (UE), a set of sounding reference signals;
estimating a set of channel state information parameters, wherein each channel state information parameter of the set is based at least in part on a respective sounding reference signal of the set of sounding reference signals; and
outputting, from at least one of the one or more network entities and to the UE, a set of transmissions, wherein each transmission of the set of transmissions comprises a respective pseudo-noise signal that is based at least in part on a different gain parameter of a set of gain parameters, wherein each gain parameter of the set of gain parameters is based at least in part on a different channel state information parameter of the set of channel state information parameters, wherein each gain parameter of the set of gain parameters is included in the set of gain parameters based at least in part on being less than a first threshold and greater than a second threshold.

30. A method for wireless communication at a user equipment (UE), comprising:
receiving, by the UE and from one or more network entities, a set of channel state information reference signals;
estimating a set of channel state information parameters, wherein each channel state information parameter of the set is based at least in part on a respective channel state information reference signal of the set of channel state information reference signals; and
transmitting, by the UE and to at least one of the one or more network entities, a set of transmissions, wherein each transmission of the set of transmissions comprises a respective pseudo-noise signal that is based at least in part on a different gain parameter of a set of gain parameters, wherein each gain parameter of the set of gain parameters is based at least in part on a different channel state information parameter of the set of channel state information parameters, and wherein each gain parameter of the set of gain parameters is included in the set of gain parameters based at least in part on being less than a first threshold and greater than a second threshold.

* * * * *